United States Patent
Iovanna et al.

(10) Patent No.: US 9,509,526 B2
(45) Date of Patent: Nov. 29, 2016

(54) METHOD AND APPARATUS FOR QUALITY OF SERVICE (QOS) PLANNING FOR AN ETHERNET BASED NETWORK

(75) Inventors: Paola Iovanna, Rome (IT); Roberto Sabella, Grottaferrata (IT); Ivano Bartoli, Rome (IT); Laura Vellante, Rome (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1386 days.

(21) Appl. No.: 12/105,926

(22) Filed: Apr. 18, 2008

(65) Prior Publication Data
US 2009/0022070 A1  Jan. 22, 2009

(30) Foreign Application Priority Data

Apr. 4, 2007 (WO) .................. PCT/EP2007/053911

(51) Int. Cl.
| | | |
|---|---|---|
| *H04L 12/28* | (2006.01) | |
| *H04L 12/46* | (2006.01) | |
| *H04L 12/24* | (2006.01) | |
| *H04L 12/701* | (2013.01) | |
| *H04L 12/707* | (2013.01) | |
| *H04L 12/703* | (2013.01) | |
| *H04L 12/753* | (2013.01) | |

(52) U.S. Cl.
CPC ........... *H04L 12/462* (2013.01); *H04L 12/465* (2013.01); *H04L 41/145* (2013.01); *H04L 41/5045* (2013.01); *H04L 45/00* (2013.01); *H04L 45/22* (2013.01); *H04L 45/28* (2013.01); *H04L 45/48* (2013.01); *H04L 41/12* (2013.01)

(58) Field of Classification Search
CPC ....... H04L 45/02; H04L 45/22; H04L 45/28; H04L 45/48; H04L 12/4616; H04L 12/4641
USPC ................... 370/256, 228, 395.53, 221, 248; 709/220
See application file for complete search history.

(56) References Cited

U.S. PATENT DOCUMENTS

| | | | |
|---|---|---|---|
| 6,937,576 B1 * | 8/2005 | Di Benedetto et al. ...... 370/256 |
| 7,760,668 B1 * | 7/2010 | Zinjuvadia .................... 370/256 |
| 2004/0081171 A1 * | 4/2004 | Finn ......................... 370/395.53 |
| 2005/0149625 A1 * | 7/2005 | Rouyer et al. ................ 709/220 |
| 2005/0152289 A1 * | 7/2005 | Nagata et al. ................ 370/256 |
| 2006/0007939 A1 * | 1/2006 | Elangovan ............... 370/395.53 |
| 2006/0268749 A1 * | 11/2006 | Rahman et al. .............. 370/256 |
| 2007/0177527 A1 * | 8/2007 | Bragg et al. .................. 370/256 |
| 2007/0263554 A1 * | 11/2007 | Finn .............................. 370/256 |
| 2008/0089245 A1 * | 4/2008 | Reichstein et al. ........... 370/256 |
| 2008/0112312 A1 * | 5/2008 | Hermsmeyer et al. ........ 370/228 |
| 2008/0181138 A1 * | 7/2008 | Dalberg ........................ 370/256 |
| 2008/0316917 A1 * | 12/2008 | Farkas et al. ................. 370/221 |
| 2010/0226260 A1 * | 9/2010 | Zinjuvadia et al. .......... 370/248 |
| 2011/0026438 A1 * | 2/2011 | Farkas et al. ................. 370/256 |

* cited by examiner

*Primary Examiner* — Dang Ton
*Assistant Examiner* — Lionel Preval

(57) ABSTRACT

A method for determining required routes through an Ether based network associated with VLANs by determining a set of spanning trees. The set of spanning trees is determined to provide a number of routes for consideration. Each spanning tree comprising a plurality of links, sorts the VLANs into an order based on one or more VLAN criteria for the network topology, and maps the sorted VLANs onto the set of spanning trees in an order to optimise one or more characteristics relating to the combination of spanning tree and VLAN to determine an optimised VLAN tree mapping for each set of spanning trees for each route. A best primary tree for each route is selected. Possible failures for each link in the best primary tree for each route are analyzed to derive for a backup tree optimised to determine one or more best backup trees in the event of a possible failure.

32 Claims, 20 Drawing Sheets

METHOD AND APPARATUS FOR QUALITY OF SERVICE (QOS) PLANNING FOR AN ETHERNET BASED NETWORK

This application claims the benefit of patent application number PCT/EP2007/053911 filed on Apr. 20, 2007, the disclosure of which is fully incorporated herein by reference.

TECHNICAL FIELD

The present invention relates to a method and apparatus for quality of service (QOS) planning for an Ethernet based network, particularly but not exclusively for a multiple spanning tree protocol (MSTP).

BACKGROUND

It is a common networking issue to plan the network in order to manage the traffic flow, provide quality of service and protection and to allow an efficient use of all the network resources. In the environment of an Ethernet network this ability to plan the available virtual LANs (VLANs) does not currently exist. Ethernet technology requires the use of protocols belonging to the spanning tree protocol (STP) family, in order to make the best of the available network topology. The use of STP, has the effect of reducing the active topology of the network to a tree, also known as spanning tree in the context of STP-related protocols, which excludes all other links in the networks that may be used in case of failure. The STP tree thus does not provide any information relating to available routes in case of failure.

STP has evolved into a different protocol called rapid spanning tree protocol (RSTP) in order to reduce the convergence time in the case of route failures. However RSTP does not improve the efficient use of the available resources in the network because it uses a single tree on the physical topology. In order to overcome the limitations associated with STP and RSTP, a multiple spanning tree protocol (MSTP) has been standardised. MSTP allows configuration of a number of different trees on the physical topology of the network. Each tree (sometimes referred to as an MSTP instance) is independent of the other trees on the network. This means that loops can be prevented by assigning two links or nodes that form a loop on the physical topography of the network to different trees in that network. Similarly, traditional STP or RSTP planning forces the protocol to exclude the use of one of the two links where a loop is formed. It should be noted that MSTP provides for there to be more links within the physical topology of the network plan than would be the case with STP. Concerning the VLANs, an MSTP provides the ability to map a group of VLANs on each MSTP instance. Usually, the number of VLANs that a network operator has to be accommodated is bigger than the number of MSTP instance that can be configured.

One of the critical problems today is that there is no effective method of mapping the VLAN's onto appropriate trees. In actual fact, the mapping of VLAN's onto the trees is generally performed manually during the planning stage of the network. This is a serious limitation to the efficiency of MSTP due to the intensive calculation required to determine the suitable number of trees to be used and the mapping of VLAN's to those number of trees. As this is done manually the design of the paths or routes through the network become increasingly difficult for the operator to perform. In addition, this is only half the problem as the same calculations have to be made for one or more backup paths for each route. Moreover, when primary and backup trees must be calculated according to MSTP rules, the problem is very complex without the support of a procedure. This can significantly increase the amount of mapping the operator must perform.

At the present time Ethernet is a very attractive technical solution due to its simplicity and relatively low-cost technology and the need to find a way of using Ethernet with quality of service support is very real. This is particularly the case in the application of Ethernet technology to metro networks. In this environment quality of service performance and carrier class performance are vital.

At present there are no ways of guaranteeing quality of service, "carrier class" performance and optimised traffic balance in Ethernet based networks. These functions are generally referred to as "traffic engineering". In actual fact the main way in which quality of service is provided in current environment is by "over provisioning". However over provisioning presents two main drawbacks: there is no guarantee of quality of service and generally a considerable waste of resources.

MSTP provides the possibility to configure a greater number of trees on the physical topology so as to augment the number of physical links that can be used, thereby improving the network resource utilisation. However, operators continue to manually configure the networks and tend to use fewer trees. As a result Ethernet based networks are generally relatively small and with simple network topologies such as a simple tree or ring that can be easily visualised. Typically if a bigger network is envisaged several smaller Ethernet networks are connected by layer 3 (e.g. the IP layer) or using multi-protocol label switching (MPLS) technologies. While this can provide a larger network it is usually at greater than necessary expense, making Ethernet more expensive than other technologies.

In addition, the evolution towards the conversion model of networks requires that Ethernet technology is adopted into bigger networks having generic topologies. For example, large metro networks or Ethernet radio access networks (RANs) are conceivable where any topology or size could apply.

SUMMARY

Accordingly one object of the present invention is to provide a solution to at least some of the problems associated with the prior art in respect of Ethernet networks.

According to one aspect of the present invention, there is provided a method of network planning for an Ethernet based network having a network topology and a plurality of VLANs to be associated therein wherein a number of routes is required through the network.

A set of spanning trees within the network is determined for providing one or more of the number of routes for consideration, wherein each spanning tree comprises a plurality of links. Furthermore, the VLANs are sorted into an order based on one or more VLAN criteria for the network topology. The sorted VLANs are mapped onto the set of spanning trees in an order to optimise one or more characteristics relating to the network or any associated feature thereof for the or each combination of spanning tree and VLAN to thereby determine an optimised VLAN tree mapping for each set of spanning trees for each route. A best primary tree is accordingly selected from the set of spanning trees for each route in the network topology according to the optimised VLAN tree mapping. Furthermore, possible failures for each link in the best primary tree for each route are analysed to derive for each possible failure a backup tree which is optimised in terms of the characteristics and criteria to determine one or more best backup trees to replace the or each best primary tree in the event of a possible failure of the analysed possible failures. Information relating to the best primary tree and the determined one or more best backup trees for each best primary tree for each route in the network is outputted. The information may be further processed and/or stored. Preferably, the best primary tree and the determined one or more best backup trees for each best primary tree for each route in the network are translated into a set of spanning tree protocol configuration parameters which in combination form a network plan and are output as the information relating to the best primary tree and the determined one or more best backup trees for each best primary tree for each route in the network.

According to a another aspect of the invention, a network planning apparatus for an Ethernet based network having a network topology and a plurality of VLANs to be associated therein wherein a number of routes is required through the network is provided.

The apparatus is adapted to determine a set of spanning trees within the network for providing one or more of the number of routes for consideration, wherein each spanning tree comprises a plurality of links, to sort the VLANs into an order based on one or more VLAN criteria for the network topology, to map the sorted VLANs onto the set of spanning trees in an order to optimise one or more characteristics relating to the network or any associated feature thereof for the or each combination of spanning tree and VLAN to thereby determine an optimised VLAN tree mapping for each set of spanning trees for each route, to select a best primary tree from the set of spanning trees for each route in the network topology according to the optimised VLAN tree mapping, to analyse possible failures for each link in the best primary tree for each route to derive for each possible failure a backup tree which is optimised in terms of the characteristics and criteria to determine one or more best backup trees to replace the or each best primary tree in the event of a possible failure of the analysed possible failures, and to output information relating to the best primary tree and the determined one or more best backup trees for each best primary tree for each route in the network.

The network planning apparatus may be adapted to perform any of the steps of a method described herein.

The present invention also concerns a computer program for network planning for an Ethernet based network having a network topology and a plurality of VLANs to be associated therein wherein a number of routes is required through the network. The computer program comprises portions of software codes in order to implement the method as described when operated at a computing device functioning then as a network planning apparatus. The computer program can be stored on a computer-readable medium. The computer-readable medium can be a permanent or rewritable memory within the computing device or located externally. The computer program may be transferred to the computing device for example via a cable or a wireless link as a sequence of signals.

The computer program comprises code adapted to determine a set of spanning trees within the network for providing one or more of the number of routes for consideration, wherein each spanning tree comprises a plurality of links, to sort the VLANs into an order based on one or more VLAN criteria for the network topology, to map the sorted VLANs onto the set of spanning trees in an order to optimise one or more characteristics relating to the network or any associated feature thereof for the or each combination of spanning tree and VLAN to thereby determine an optimised VLAN tree mapping for each set of spanning trees for each route, to select a best primary tree from the set of spanning trees for each route in the network topology according to the optimised VLAN tree mapping, to analyse possible failures for each link in the best primary tree for each route to derive for each possible failure a backup tree which is optimised in terms of the characteristics and criteria to determine one or more best backup trees to replace the or each best primary tree in the event of a possible failure of the analysed possible failures, and to initiate an output of information relating to the best primary tree and the determined one or more best backup trees for each best primary tree for each route in the network. The computer program may comprise further code to implement any steps of the method described.

The present invention has many advantages which will be cleared from the detailed description. At a high level these include a solution which allows an operator to configure an Ethernet network having one or more of the following advantages:

an optimal balance to the traffic in the network;
a reduction in over provisioning which thereby produces an optimal use of network resources;
a methodology which supports quality of service;
the provision of protection trees while maintaining quality of service considerations;
ability to use the maximum number of VLANs and allowed by the standard (i.e. typically of the order of 4000);
allowing the extension of Ethernet technology to larger networks that are generally characterised by a generic topology, for example mesh networks;
allowing a reduction in cost of the network that can apply layer 2 technology instead of layer 3 or 2.5 technology, for example such as IP or MPLS;
automation of the processes and procedures mentioned above thus fully exploiting the potential of MSTP, particularly for large size networks and large size traffic matrices;
allowing choice the root of each tree according to network operator needs, without the need to depend on Media Access Control (MAC) address;
use of any node (i.e. any MAC address) and the substitution of a node in case of failure without the need to reconfigure the network.

BRIEF DESCRIPTION OF THE DRAWINGS

Reference will now be made by way of example, to the accompanying drawings, in which.

DETAILED DESCRIPTION

Figure 1:
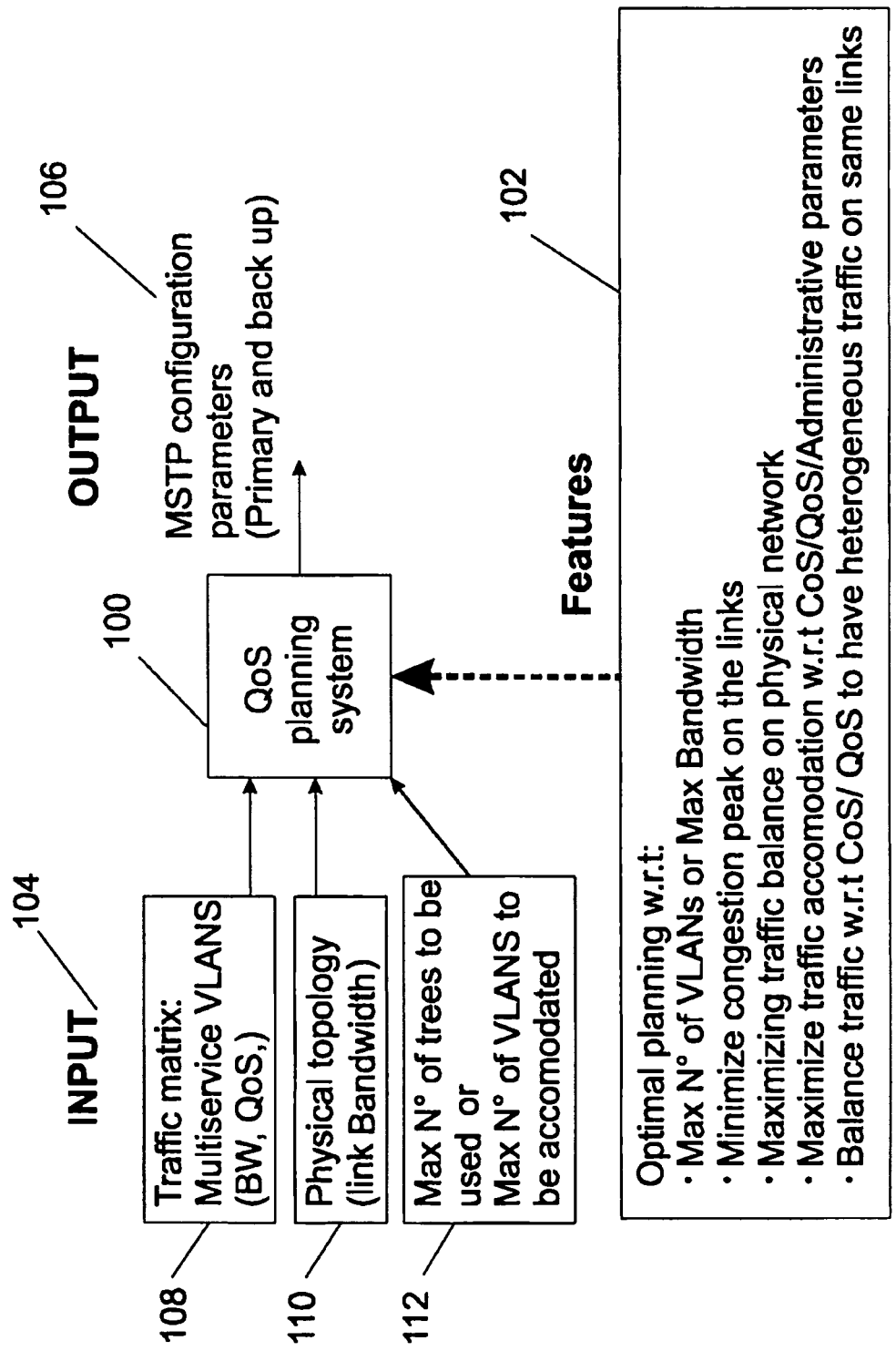
FIG. 1 is a block diagram showing an overview of the quality of service planning system according to one embodiment of the present invention.

The present invention relates to a quality of service planning system for Ethernet based networks including metro networks. The basic concepts of the solution are shown in the overview block diagram in FIG. 1. The quality of service planning system 100 is influenced by a number of features 102 which are applied to inputs 104. This results in an output MSTP configuration parameter set for the network design 106. This output may be automatically fed into a network plan (not shown) in any appropriate way to automatically implement the required network design. The inputs include inter alia details of the traffic matrix 108, physical topology and bandwidth information 110, and/or details 112 of the maximum number of trees to be used (or optionally the maximum number of VLANs to be used). The features which can be applied in the planning system will be described in greater detail below and the features which enable optimal planning may include:

maximum number of VLAN's,
maximum bandwidth,
minimisation of congestion peaks on each link,
maximisation of the traffic balance on the physical network,
maximisation of traffic accommodation with respect to class of service (CoS), quality of service and administrative parameters,
balance of traffic with respect to class of service and quality of service to arrive at heterogeneous traffic on the same links in the network.

Optimum network planning is achieved by use of an algorithm which will be described in greater detail below but in summary includes a number of calculations and a number of principal steps. The calculations relate to determining the best trees, the best aggregation of VLANs in individual sets of VLANs and the best mapping of the VLAN sets onto the best trees.

The terms "tree", "route", and "path" as well as "first", "primary", "secondary", and "backup" are not always used consistently in the literature. In the context of the present application, however, "route" and "path" are used synonymously for a "tree onto which a VLAN has been mapped". Furthermore, a "primary tree" is equivalent to a "primary path" or "primary route" and a "backup tree" to a "backup path" and a "backup route". Also, no differentiation is made between "first" and "primary" as well as between "secondary" and "backup".

The principal steps that are carried out to arrive at an optimum network plan include:

determination of the possible sets of trees by means of any suitable algorithm optimal organisation of the order of the VLANs to find the best routing on the physical topology for each VLAN considering some or all of the inputs permitted as mentioned above (e.g. type, bandwidth, class of service, etc), determination of the best routing (primary spanning trees) on the physical topology according to physical link cost functions to ensure balance of traffic taking into account the order of the VLANs, determination of backup trees for the primary spanning trees calculated at the previous step iteration of each step to optimise all the parameters and steps, translation of the quality of service plan into MSTP (or other spanning tree protocol) configuration parameters.

The invention provides a suitable set of trees capable of being configured on the physical topology and corresponding mapping of the VLAN is on such trees in order to balance the traffic, to optimise the use of the network resource, to evenly distribute traffic in the network according to quality of service criteria and to provide backup paths. A key feature of the present invention is the capability of choosing appropriate trees and routing the traffic and mapping the VLANs on the trees based on the physical network topology and the available bandwidth on each of the links of the network.

Moreover this results in the provision of a quality of service on the network as a result of balancing the traffic on the network in such a way that traffic belonging to the same quality of service class can be evenly distributed. This in turn means that the traffic travelling on each link is heterogeneous making scheduling and traffic management techniques at each node more efficient. For example, if a node is approaching a point of being congested the traffic management technique pre-empts the lower quality traffic thereby saving the higher quality traffic. Due to the manner in which the present invention is implemented it can be applied to all types of network topologies and sizes.

With respect to the provision of configuration within the MSTP protocol a range of values of parameters to be configured can be assigned. These parameters may include priority ports, Bridge priority etc. This ensures that the hierarchical relationship among the nodes in each tree is maintained. It also allows operators to control the paths of certain traffic according to their individual needs and also means that the operator can fix primary and backup paths for any topology and traffic matrix.

The detailed technical solutions will now be described with respect to two separate issues. The first issue relates to the calculation and determination of primary paths. The second refers to backup path calculations to be used in circumstances where the primary paths experience a failure of some sort or another. The primary trees calculation chooses a suitable set of trees and performs mapping of VLANs onto those trees in order to meet the features reported in FIG. 1, i.e. balance traffic on the physical network. For each link failure of a primary tree an alternative with respect to the failed link has to be provided. The backup tree calculation may provide one backup tree for each link failure of each primary tree.

The invention makes use of a heuristic process to ensure the quickest means of reaching convergence with the solution that optimises the performance of the two phases mentioned above. It is for this reason that the primary paths are determined first and the secondary paths (aka backup paths) as part of a second operation as the primary paths are more important to be optimised. In addition the secondary paths are often only for a temporary situation, as once the failure has been repaired (or overcome if in relation to congestion issues) the network will return to the initial configuration i.e. the primary path.

The method used to balance the traffic is a key aspect of the present invention. In fact, traffic balance is a key element of any traffic management environment and consists of balancing traffic on the physical topology in order to optimise the use of network resources. In the Ethernet network it is not possible to operate directly in the physical topology, due to the fact that the STP protocols impose the requirements to use logical topologies (also know as trees). The present invention includes a method of correlating the operation on the physical topology with the operation on the logical topology to optimise the balance between the two.

Primary Paths Calculation Phase

The calculation for the primary paths comprises a number of steps, each of which will now be described in detail.

Calculation of the Possible Set of Trees

The calculation of the set or sets of trees can be performed by means of any suitable algorithm. A random process could be used to calculate the sets of trees for feasibility reasons. If all possible trees were calculated for a given physical topology and then the selection of the maximum number of trees is made within the set, the processing operation could take a very long time. It will be appreciated that the number of possible trees grows significantly as the number of nodes in the network increases. For example in the case of mesh networks a number of possible trees is $N^N$, where N is the number of nodes in the network. Analyses on the impact on network performance in respect of the tree calculations being carried out on a random basis reveals: the resulting trees are just as likely to perform well if they are calculated on a random basis (i.e. considerably less calculations are carried out) than if tree calculations are calculated for all the possible trees.

As previously indicated with respect to FIG. 1 the maximum number of trees is an optional input parameter for the quality of service solution. This maximum number of trees depends on the individual node where the solution has to be implemented. A typical example for a current Ethernet Traffic Node (ETN, e.g. 24xx family) has a number of trees of 16. If the total number of trees is less than the maximum allowed as may be the case for small topologies all possible trees may be calculated in the tree calculations.

The sets of trees can be calculated on a one by one basis or each set of trees can be calculated iteratively preceding the stage of ordering the VLANs. In this latter case the iterative procedure ends according to one or more certain criteria. One criterion could be to reach a fixed number of sets or to satisfy a objective function. For example, the generation of a further spanning trees set with a next iteration may not improve the solution with respect to the objective function, such as percentage of VLANs/bandwidth that have been accommodated; congestion peak, traffic balance on the network; etc.

Ordering the VLANs Within the Network

The ordering phase aims to satisfy two main issues: the first one is to satisfy the criteria of the solution (e.g. maximize number of VLANs, maximize bandwidth, etc.); the second one is to facilitate the choice of the best route (best tree) during the next phase (Allocation of the VLAN to different trees for each set of trees, chapter 1.3).

Within the network it is important that all the available resources are used to the optimum level. In an Ethernet network this requires the analysis of the available VLANs on the network and an order to those VLANs to enable optimisation of resources. Within the network there are many different types of VLAN, both unicast and multicast, including multipoint multipoint, point-to-point, point to multipoint etc.

For the purposes of network planning the unicast VLANs are represented as a list of traffic demands, between a source node and a destination node, while the multicast VLANs are represented as a list of traffic demands among one source node and more than one destination nodes.

All of the traffic demands for each VLAN must be accommodated on the same tree. For each traffic demand for a given VLAN the best routing for both unicast and multicast traffic is performed on the complete list of pre-calculated trees. The tree that allows the best traffic balance on the network is then chosen to accommodate that VLAN.

When each VLAN is mapped onto each possible calculated tree, the bandwidth occupancy level for the mapping is measured in order to associate with each VLAN a parameter that represents the level of bandwidth occupancy of such VLAN in the network. In other words this parameter represents the impact of each VLAN on the network in terms of bandwidth occupancy when the best tree is used (best case).

The level of bandwidth occupancy is calculated as follows. It is assumed that each VLAN is accommodated on each tree at a given time. The percentage of the total bandwidth occupied on each tree is defined as $I_{v,t}$ (where I is the bandwidth occupancy of the VLAN "v" on tree "t"). The percentage is calculated as a ratio between the total occupied bandwidth and the total bandwidth capacity. The optimum congestion level of the VLAN in question is selected to be the smallest value of $I_{v,t}$. This bandwidth occupancy level is calculated in accordance with the following formula:

$$I_v = \min_t I_{vt} \quad \text{formula 1}$$

where $$I_{vt} = \frac{\sum_{d \in v} n_d \cdot b_d}{\sum_{a \in A_v} c_a};$$

"d"=traffic demand of the VLAN "V"
$b_d$=bandwidth of "d"
$n_d$=number of used arches on the tree "t"
$c_a$=capacity of each arch "a" of the tree "t"
$A_v$=set of arches of the tree "t" occupied by the traffic demand of the VLAN "v"

An arch is a branch. Both terms are used synonymously.

The percentage of occupied bandwidth of each link is chosen as a parameter due to the fact that the network can have different sized links. The use of percentage unifies the results for different sized links.

Once the bandwidth occupancy levels are calculated for the VLANs, they may then be sorted into an order according to the considered criterion (e.g. the features in FIG. 1).

If the criterion is to maximize the number of accommodated VLANs, the ordering starts with the smallest level of bandwidth occupancy and ends with the greatest level of bandwidth occupancy.

If the criterion is maximizing the amount of accommodated bandwidth, the ordering sorts the VLANs from the VLAN with the highest bandwidth occupancy to the VLAN with the lower bandwidth occupancy.

In the present invention it is also possible to consider different ordering criteria together in order to satisfy the features described with reference to FIG. 1.

The effect of the VLAN ordering criteria impacts on the next phase of the process, since as the VLANs are accommodated the available bandwidth on each tree decreases. The process then chooses the next suitable tree on the basis of the new available bandwidth caused by the previous mapping. This means that the choice of tree to accommodate the $K^{th}$ VLAN depends on the available bandwidth after the accommodation of the previous $K^{th-1}$ VLAN.

For example, if the network planning criterion is to maximize the number of accommodated VLANs, the tree will be populated with smaller bandwidth occupancy VLANs first and then larger bandwidth occupancy VLANs later. In this way the level of bandwidth occupancy on the network varies less than if the situation was operating in the opposite sense, in other words if the larger bandwidth occupancy VLANs are allocated to the trees before the smaller bandwidth occupancy VLANs. If the bandwidth occupancy of the network does not vary very much the network appears to be quasi-empty which in some aspects is a verification that the allocation of VLANs has been carried out in an optimal manner and the best congestion levels have been calculated. In this case this would suggest that the tree constitutes one of the best trees in terms of congestion level and will thus be selected.

It is possible to perform VLANs ordering based on other criteria related to the VLAN, for example according to a class of service (COS). In this case the VLANs are organised in sets according to their class of service and then any further processing (as will be described below) is started with the highest priority sets and followed with the lower priority sets. This ensures that traffic balance is performed in terms of class of service as well as congestion levels thereby ensuring that on each link of the network different class of service VLANs are allocated. The reasons for this will be described in greater detail under the section relating to class of service support. The main consequence of this is that during traffic balancing considerations relating to class of service, these are also taken into account. This ensures that on each link of the network different class of service VLANs are allocated and accommodated. The process works on the basis of allocating VLANs with the same class of service at the same time, this means that there is an even distribution throughout the network on all possible trees of the network of VLANs of a specific class of service, so VLANs of different classes of service are then accommodated on the same trees. This has a number of advantages in that it allows for optimisation of scheduling and traffic management mechanisms in any particular node by allowing better handling of any congestion situations. Distributing VLANs of different class of service through different trees is often important.

Allocation of the VLANs to Different Trees For Each Set of Trees

For each VLAN, which has been sorted in accordance with (any of) the criteria described above a suitable tree is chosen to optimise the available bandwidth and to balance traffic on the network. In particular, for each VLAN accommodated on each possible tree, a cost is calculated. This cost depend on the percentage of occupied bandwidth (when compared with the total bandwidth) of the used links for each tree. The value of used bandwidth is updated as the demands of each VLAN are accommodated. As a result each tree is characterised by a total cost which enables the tree with the smallest cost to be chosen in the heuristic process. The costs are calculated based on the following criteria and in accordance with a cost function. In the following a possible formula for the cost function is described. For each tree of a set of trees a cost $L_{vt}$ is calculated. When V refers to the VLAN and t refers to the tree accommodating that VLAN, the sum of the cost of each arch of the tree ($L_{av}$) is summed to determine the total cost $$L_{vt} = \sum L_{av} \quad \text{formula 2}$$

$$L_{av} = \sum_{d \in v} b_{da} \cdot (1 - \beta \ln(1 - \alpha + \varepsilon)),$$

Where: "d" is the traffic demand on the VLAN
"v" is the total demand of the VLAN
"$b_{da}$" is the bandwidth occupied by "d" on each arch of the tree used by the VLAN;

$$\alpha = \frac{\sum_{d \in v} b_{da} + b'_a}{c_a} \text{ is the congestion on the arch "a"}$$

$b'_a$ is the bandwidth occupied on the arch up to the previous step (at the first step its value is "0")
$c_a$ is the capacity of the link
$\beta \in [0,1]$ is a weight for the congestion of the arch
$\varepsilon$ is a constant value to limit the log function (e.g. 0.001)

When the level of congestion is very small (i.e. the $\alpha$ value is very small), the cost of the links does not vary. On the other hand if the level of congestion is high the costs tend to grow exponentially. It will be appreciated that the tree chosen will be that with the most available bandwidth, thereby limiting the peaks of congestion and balancing the traffic on the physical network. Then for each VLAN the best tree is selected, and the VLAN is allocated on it.

Backup Path Calculation Phase

The calculation for the backup path or paths comprises a number of steps, each of which will now be described in detail.

Sorting the Trees to Fix the Order of the Backup Calculation

In respect of the backup paths there may be a number of objective functions. For each objective function there may be different one or more criteria that have to be taken into consideration to sort the trees of the purpose of backup. If the objective function is to maximise the number of accommodated VLANs the sorting of the trees is performed first with the trees having the biggest number of VLANs. As the number of VLANs in any given tree decreases, these trees will be sorted lower down in the list. On the other hand if the objective function is to maximise the accommodated bandwidth then the trees with the biggest bandwidth capacity VLANs will be sorted before those with lower capacity. It will be appreciated there are other alternatives which may influence the sorting of the trees other than those examples illustrated here.

Choice of Backup Tree

As with the primary tree, the choice of backup tree is based on the traffic load on the network. There is a difference, however, in that the primary tree calculation does not require fixing of a root node, whilst for the backup procedure a root node is fixed. If there is a specific requirement of the operator for the root node to be fixed, it will be fixed in accordance with the operators requirements (e.g. the distance between each node and the root node is kept to a minimum). Otherwise the present invention chooses the root node that maximises the number of served VLANs. This root node is chosen as it is the most complex case, however it will be appreciated that other choices may be made. In addition, for each link (or arch) failure a different backup tree has to be determined.

This means that an alternative tree is calculated for each link. The VLANs on the old tree (i.e. the tree that has an arch on the failed link) are accommodated on a new tree (the backup tree). If more backup trees are considered the tree is chosen according to the features described in FIG. 1 (e.g. if the objective is to maximize the number of accommodated VLANs, the backup tree is that one that maximize such number of VLANs). The available bandwidth on each arch is updated and takes into account in the determination of the backup tree. The failure on a particular link may involve more than one tree so the process takes into account all trees belonging to a link when a backup calculation is made.

The procedure for calculating the backup tree for the $k^{th}$ tree in the list is now considered. Let the $(k-1)^{th}$ tree share one link with the $k^{th}$ tree. When the process calculates the backup for $k^{th}$ tree on that link, the backup for $(k-1)^{th}$ tree has been already calculated. In this case the available bandwidth includes the backup tree of the $(k-1)^{th}$ tree.

If the maximum number of VLANs is considered for both root node and backup tree selection, each node is considered as a possible root node. For each possible root node and for each link failure, the set of backup trees and the corresponding number of served VLANs are calculated The smallest number of served VLANs is associated with the root node. In addition among all the possible root nodes as identified by the above two steps, the one that provides the maximum value for the served VLANs is selected.

For a given tree and root node, the rules for determining the preferred backup path are generally a fixed set of rules. For example, the determination of the rules depends on whether the backup is local, end to end or otherwise. In addition the selection may be based on whether the primary and backup possible links form part of a hierarchical tree or other type of tree.

An example is now presented to illustrate the main rules that are followed to ensure that a solution is compatible with the standard MSTP protocol. For each identified link failure the primary tree is divided into two trees: an uplink tree and a downlink tree with respect to the failed link. The process then aims to provide a backup link capable of connecting the downlink tree with the uplink tree.

Figure 2:
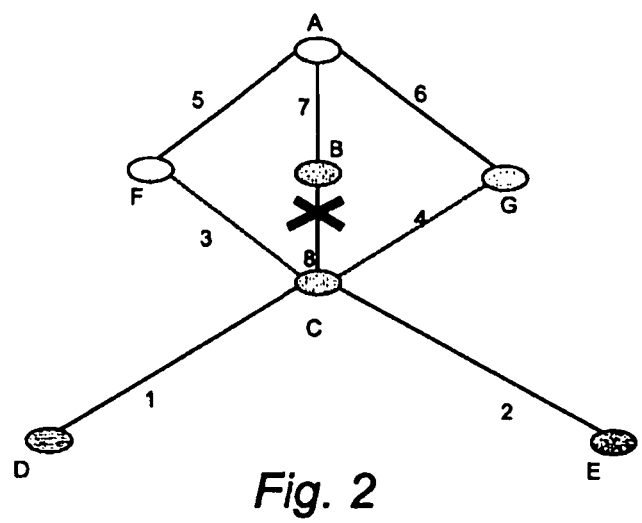
FIG. 2 is a primary tree of an example of a network according to one embodiment of the present invention.

Referring now to FIG. 2, a simple network topology is illustrated. The network includes nodes A, B, C, D, E, F, and G. The nodes are connected by links 1, 2, 3, 4, 5, 6, 7 and 8. The links shown by a continuous line represent the links of a primary tree and those that are a dotted line constitute alternative/backup arches/links. The cross on link 8 between nodes C and B illustrates a failed link between node C and node B. The object of determining the backup path is to establish to connection between nodes C and B via an alternative link. This will mean connecting node C on the uplink tree through connections 3 or 4. This ensures that the hierarchical relationship among the other nodes of the tree is maintained.

Figure 3:
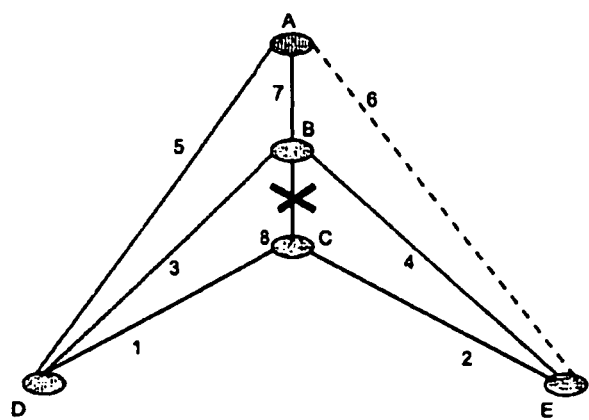
FIG. 3 is a tree diagram of a primary tree of a network according to one embodiment of the present invention.

Referring now to FIG. 3 if the node has no links connected to the uplink tree except the primary link used on the primary tree, then this node must be connected to the up tree using one of the child nodes associated therewith. A child node is one of a lower hierarchy than the node in question, that is connected to the node. In the network example shown in FIG. 3 nodes A, B, C, D and E are shown. If the link 8 between nodes C and B failed there are no links from node C that can directly connect it to the uplink tree. Accordingly the link has to be established for the backup tree with one of the child nodes i.e. via links 3; 5; 4; or 6. The backup path for child and parent nodes may be the same, that is if link 3 is chosen as backup for failure of link 8, link 3 must be chosen also for failure of link 1.

The basic rules provided a general method to assign parameters for an MSTP based network environment. For different protocols, different features may be required and the rules may be different.

Iteration of Steps 1 and 2

After steps 1 and 2 above have been carried out, each of these are iterated a certain number of times in order to find a better solution, if one exists.

This number can be fixed in advance or chosen in another way. For example, the number of iterations may be chosen according to a criterion. For example the criterion could be to stop the iterations when a certain quality has been reached (e.g. further iteration does not improve the number of VLANs accommodated). In this last case the verification that such quality measurement is performed at the end of each iteration.

Choosing the Best Set of Trees and Corresponding VLANs Mapping

The best set of trees and corresponding VLANs mapping comes about as the best result with respect to the network planning criterion. For example, if the criterion is to maximise the number of accommodated VLANs, the best set of trees is the one that allows the accommodation of the maximum number of accommodated VLANs at the same time as the minimum level of congestion on the physical topology of the network. The best trees give the best balance of traffic on the physical topology. It will be appreciated that other criteria can be used to select the best solution.

MSTP Configuration Parameter Calculations

This section of the present invention now explains the procedure for MSTP configuration parameter calculations which are an important part of this invention. As has previously been indicated the present invention allows for calculation of primary and backup trees for VLANs. This provides two different kinds of spanning tree: primary spanning trees (PST) and backup spanning trees (BST). The primary spanning tree is that which is used to accommodate traffic from one or more VLANs under normal network conditions. The backup spanning tree is a set of spanning trees for each of the primary spanning trees which is selected as a temporary replacement primary spanning tree in cases of a link failure for the original primary spanning tree. Each PST and the corresponding set of BSTs are mapped into a single MSTP instance (MSTI).

Figure 4:
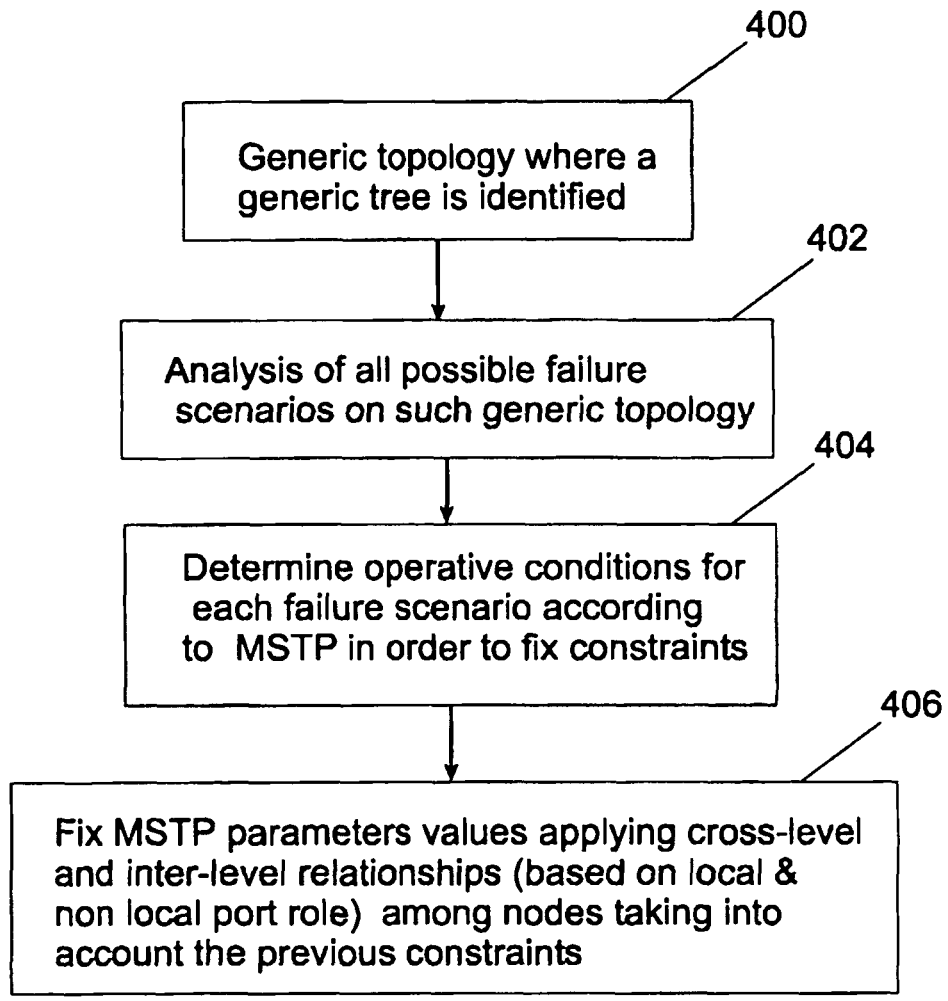
FIG. 4 is a high-level flowchart of the MSTP parameter configuration procedure according to one embodiment of the present invention.

The flowchart in FIG. 4 shows the basic steps for the MSTP parameter configuration process. A generic topology is identified with a generic tree step 400. An analysis of all possible failure scenarios on this generic topology is then determined 402. The constraints are fixed by determining the operative conditions of each failure scenario according to the MSTP 404. The MSTP parameter values are fixed by applying cross-level and inter-level relationships among the nodes taking into account the previous constraints 406.

Another important part of the present invention is the introduction of logical elements for the port role. In particular, preferred port role is indicated as the port used for the backup link. Two different types of preferred port are introduced, that are, the preferred local and the preferred not local ports, and that refer two different failure scenario.

Figure 5:
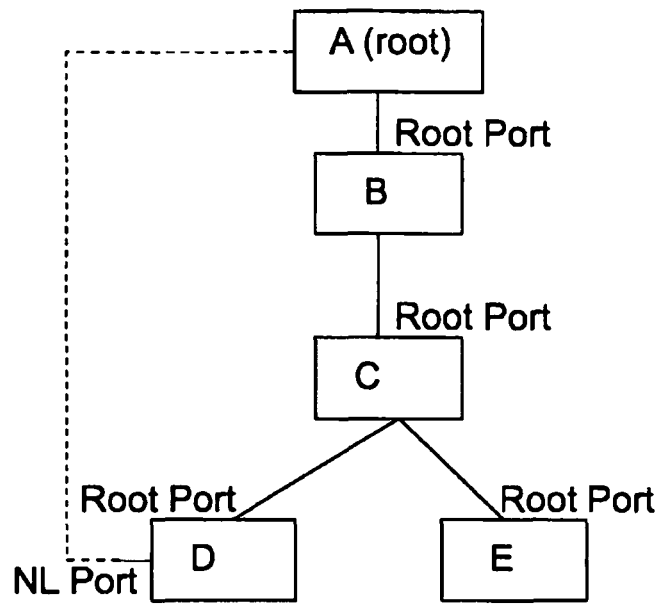
FIG. 5 is a tree topology showing a backup link for a network according to one embodiment of the present invention.

FIG. 5 shows an example of "not local port", where the dotted lines represent the backup link and a continuous lines represent the primary spanning tree (PST). It can be seen that for failure of link AB and of link BC there is no link on nodes B and C that can be used as backup. The backup link has to be provided through node D. So the preferred port of node D is not local (NL) with respect to such failures.

Figure 6:
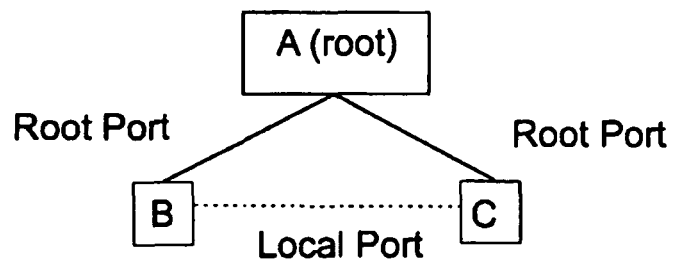
FIG. 6 is a tree topology showing a local backup link for a network according to one embodiment of the present invention.

FIG. 6 shows an example of local port. In case of failure of link AB, a link directly connected to node B exists and can be used as backup. Then the preferred port on node B is local (L).

Figure 7:
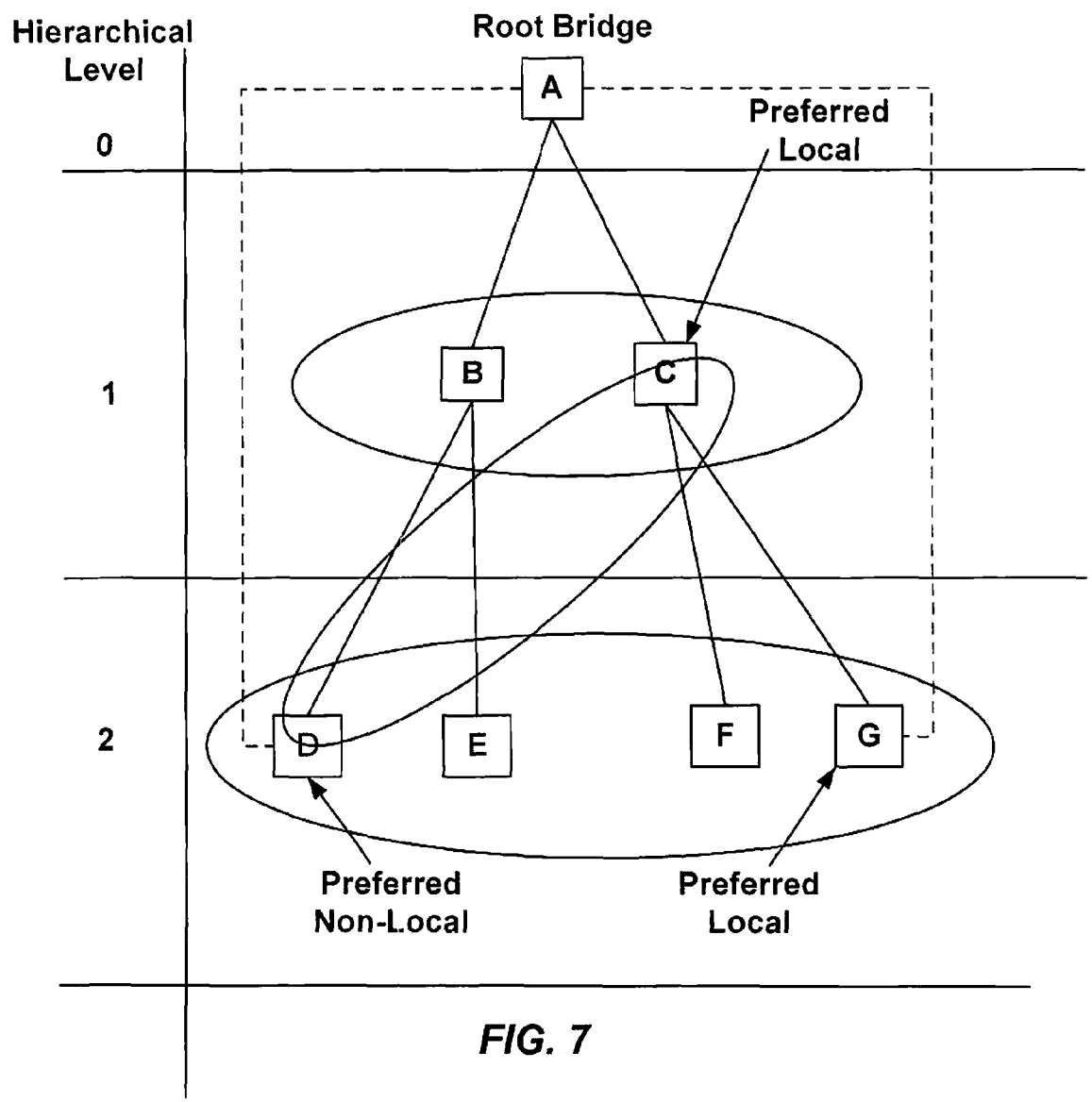
FIG. 7 is a network hierarchical level tree topology for illustrating MSTP parameter computation according to one embodiment of the present invention.

Cross-level and inter-level relationships introduced in 406 (FIG. 4) introduce the concept of hierarchical level for any primary tree. The level is generally an indicator of the number of hops or jumps necessary to arrive at the root node. An overview of how this is implemented is shown with respect to FIG. 7, where node A is located at hierarchical level 0 as it is the root bridge, nodes B and C are located at hierarchical level , while hierarchical level 2 includes nodes D, E, F and G.

The preferred port is configured by assigning a port path cost (PPC) according to the following criteria:
  types, i.e. whether the preferred port is local or not local;
  the hierarchical level of the node in the tree;
  the other preferred port path costs at the same level in the hierarchy;
  cross level relationships, e.g. the preferred non-local port path costs depend on the previous level preferred local port path costs.

Figure 8:
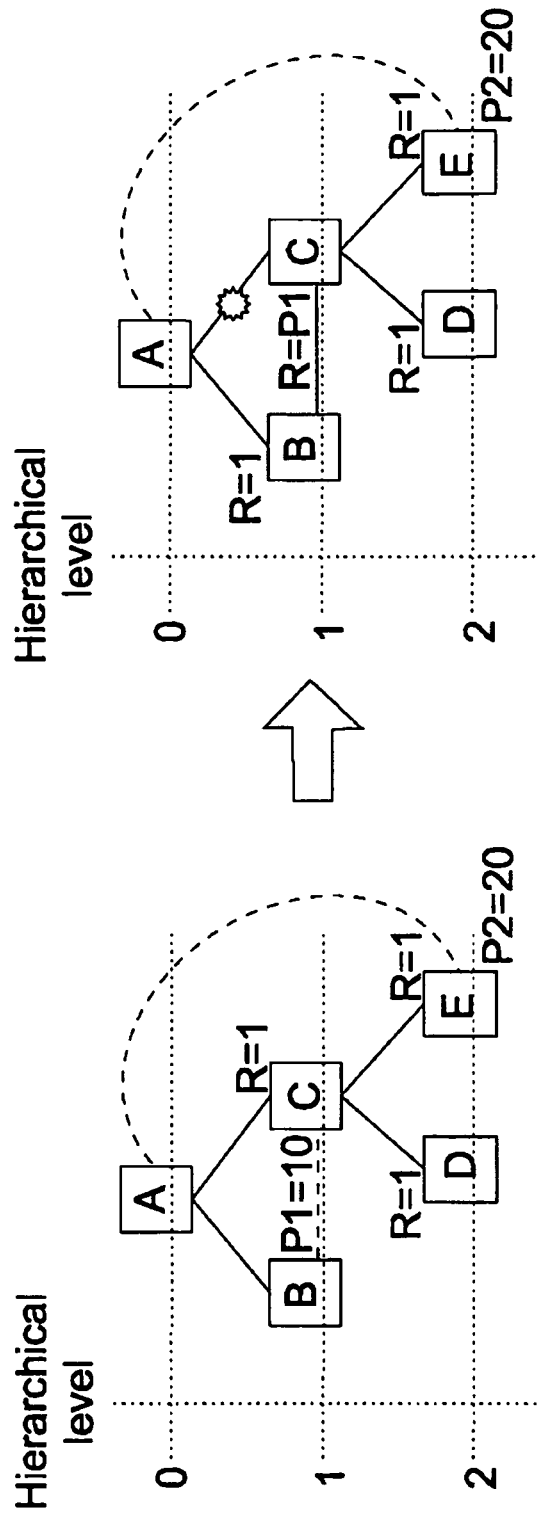
FIG. 8 is a first example and solution of a hierarchical network tree to illustrate a failure in a network link according to one embodiment of the present invention.

Referring now to FIG. 8 the example shows the primary tree on the left part and the backup tree on the right in case of failure of the link AC. Due to hierarchical approach cost for the preferred port of level 1 (P1=10) is smallest than cost at level (P2=20). In this example, node C correctly selects its preferred port (P1) to be the new root port. The link failure at level 1 has no impact on the root ports selected for the nodes belonging to level 2, i.e. nodes D and E do not change their root ports.

Figure 9:
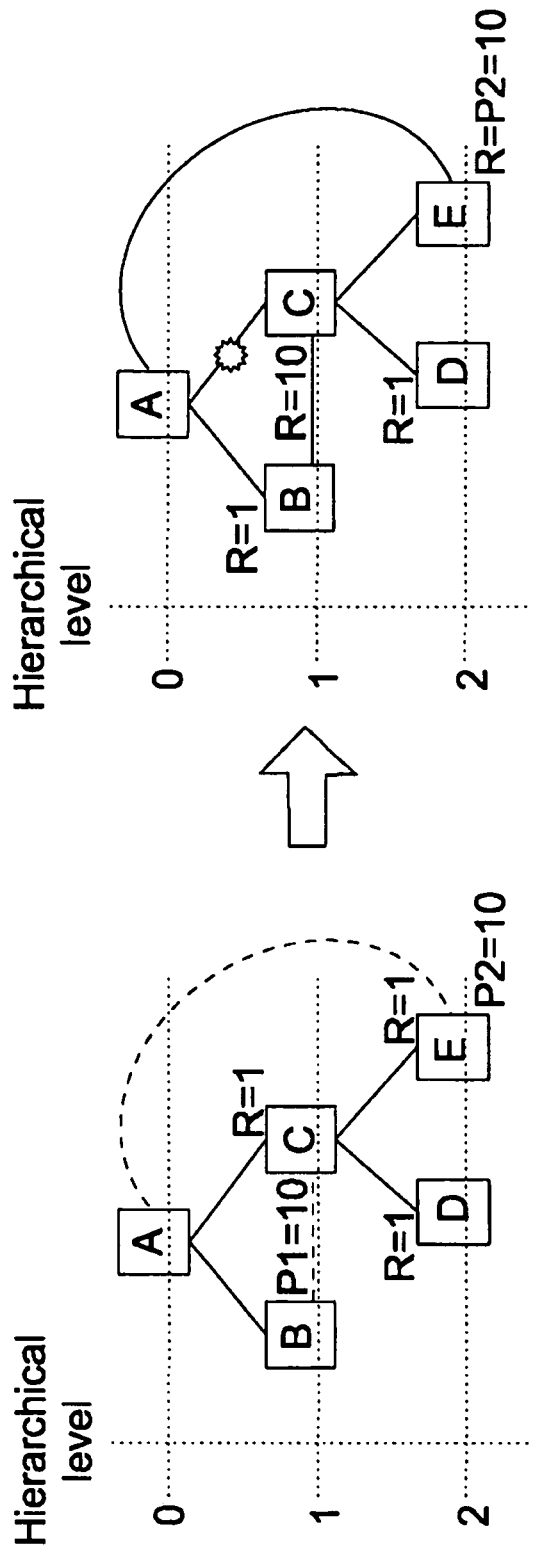
FIG. 9 is a second solution to the example in FIG. 8 not considering hierarchical levels according to one embodiment of the present invention.

If no consideration is made to the hierarchical levels of the various nodes a different result may occur. Referring to FIG. 9 it can be seen that if link AC fails then node C again selects its preferred port P1 as the new root port. However from node E the root path costs from port P2 equal 10, while the root path costs from the old root equals 1+10+1 which equals 12. Accordingly, node E will select the new root port to be P2. In this case the backup tree differs with respect to the expected one.

Figure 10:
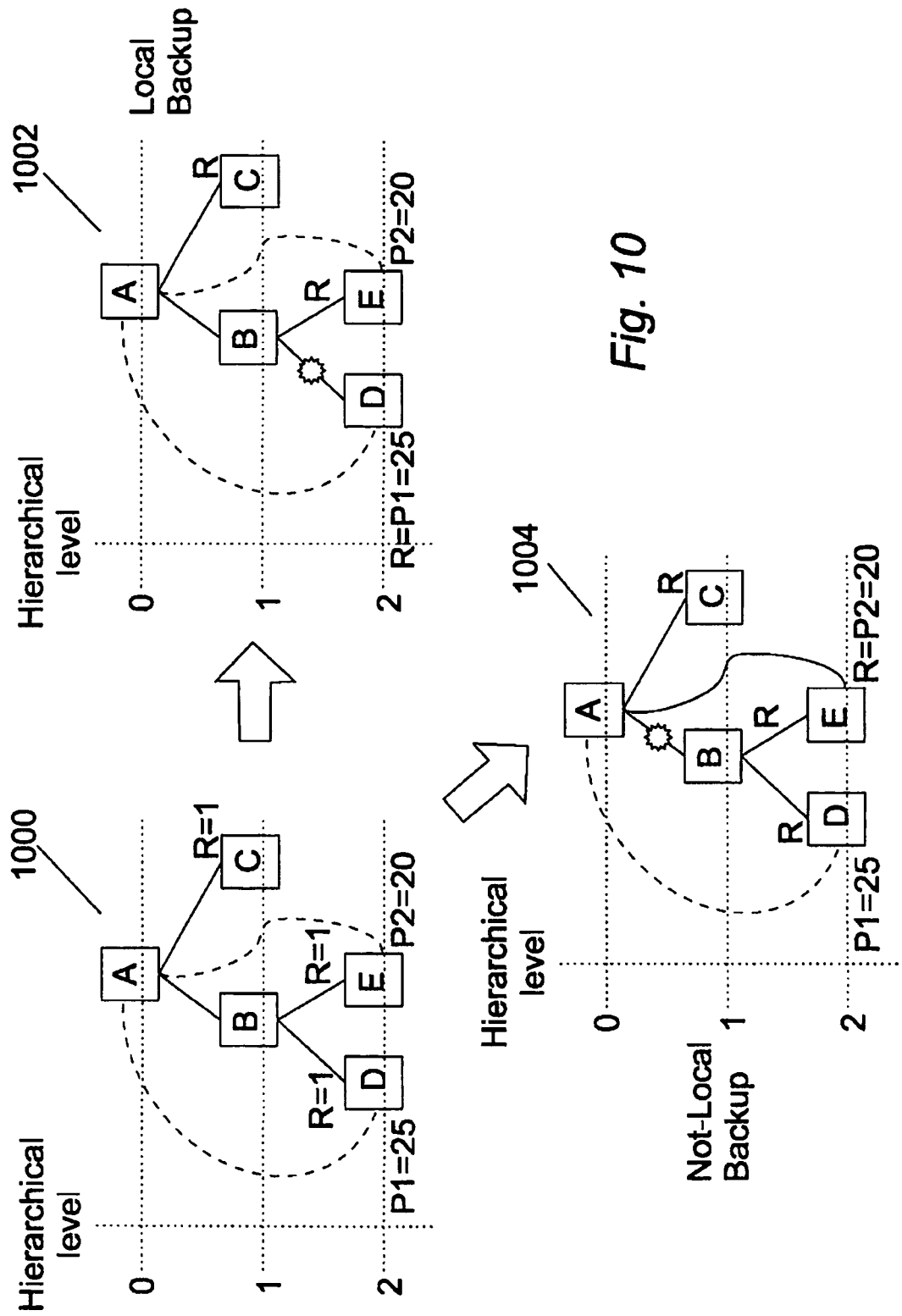
FIG. 10 is a second example and solution of a network tree to illustrate a failure in a network link according to one embodiment of the present invention.

Referring to FIG. 10 the effect of local and non-local preferred ports within the same hierarchical level are considered. The primary path from node A to node D is shown at 1000. A local backup situation is shown at 1002 where the link between node B and node D has failed. On the other hand non-local backup is shown at 1004 where the failure has occurred in link AB. Due to the different preferred port type (local and not local), P2 port path cost (NL) is smaller than P1 port path cost which guarantees that link AD is chosen for local backup and the link AE is chosen for non-local backup.

Figure 11:
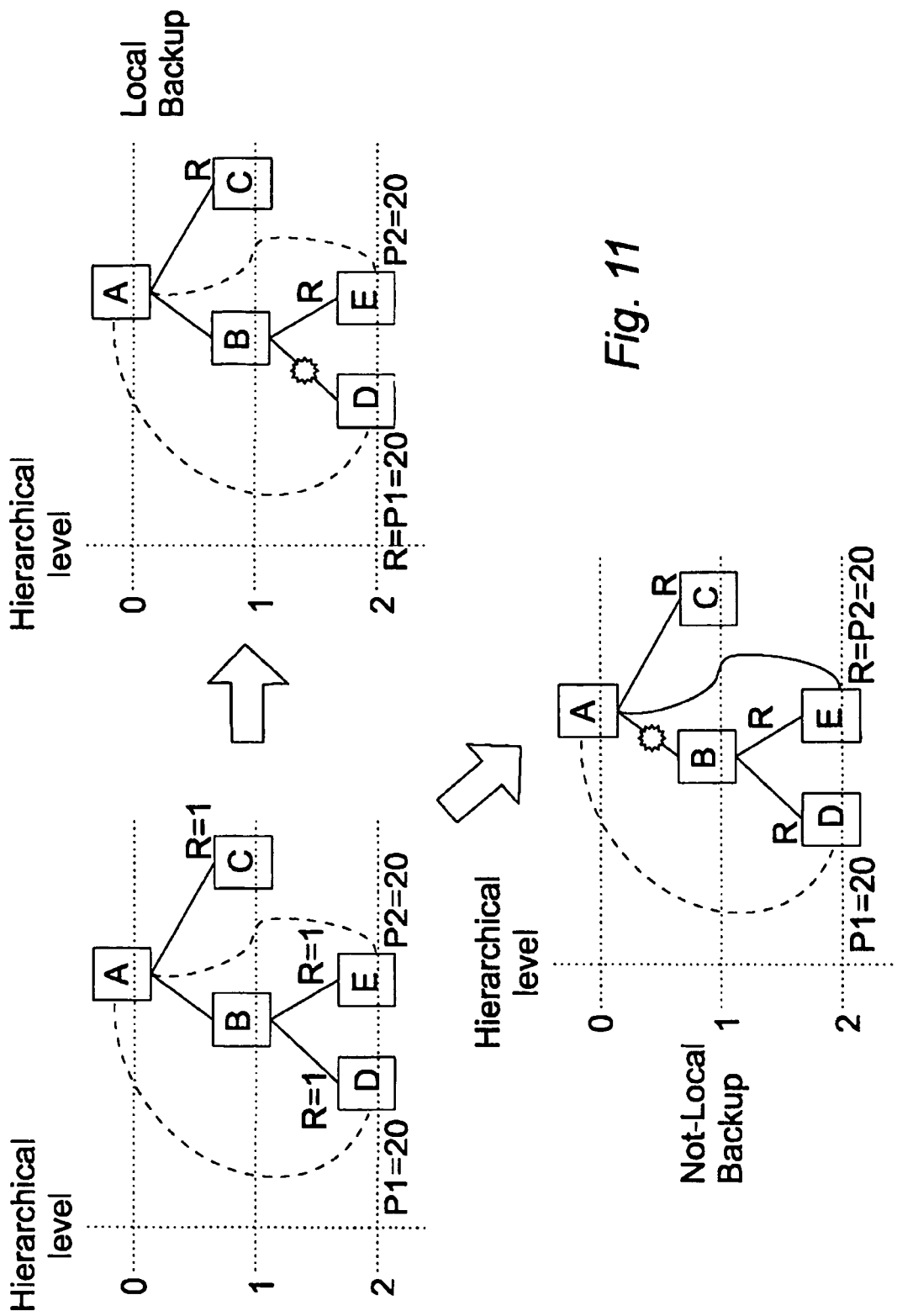
FIG. 11 is a second solution to the example in FIG. 10 not considering hierarchical levels according to one embodiment of the present invention.

If there is no consideration of different values in the same hierarchical level there, the results shown in FIG. 10 are different and becomes that shown in FIG. 11. In the non-local backup situation node B sees the same Root Path Cost (RPC) from both nodes D and E (i.e. 21) and thus in this situation root port selection is ambiguous. In this case cannot be defined a priori the correct backup.

Figure 12:
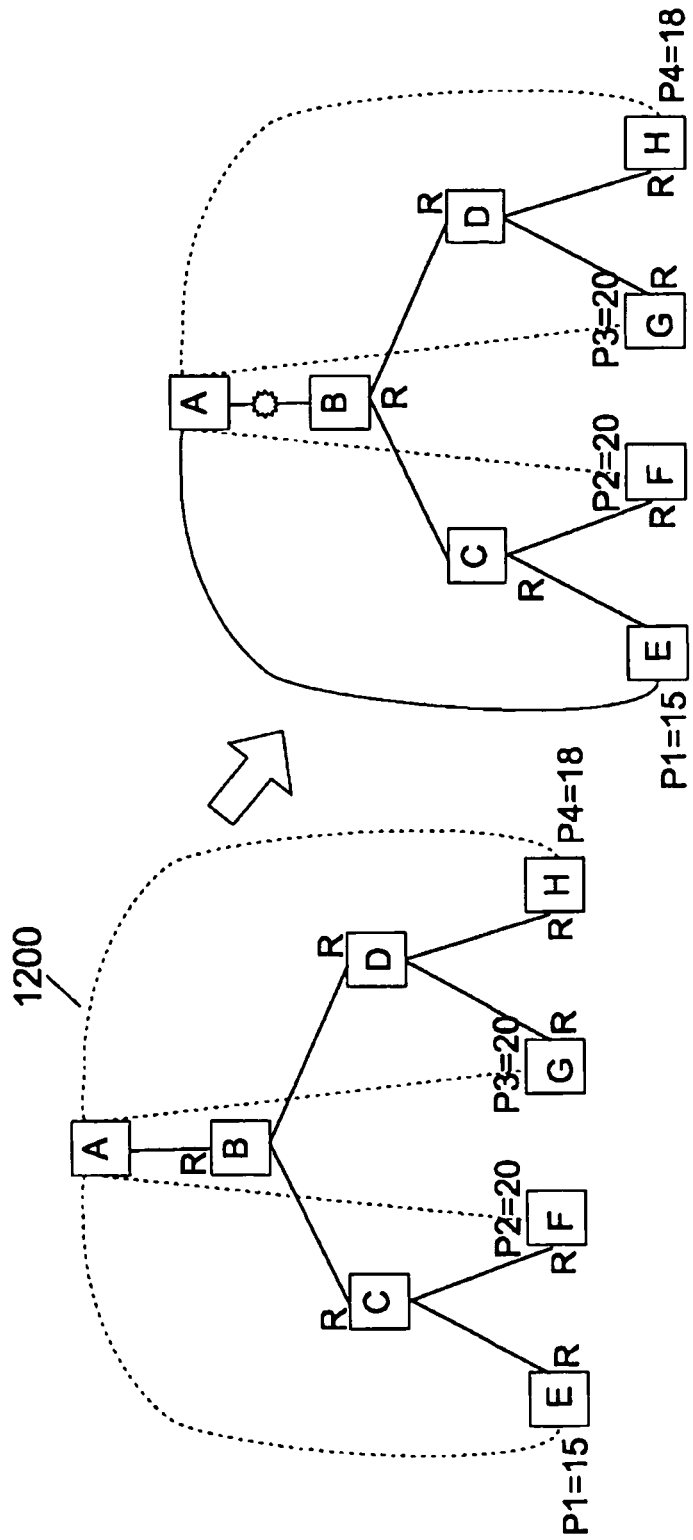
FIG. 12 is a third example of a network tree to illustrate a failure in a network link according to one embodiment of the present invention.
Figure 13:
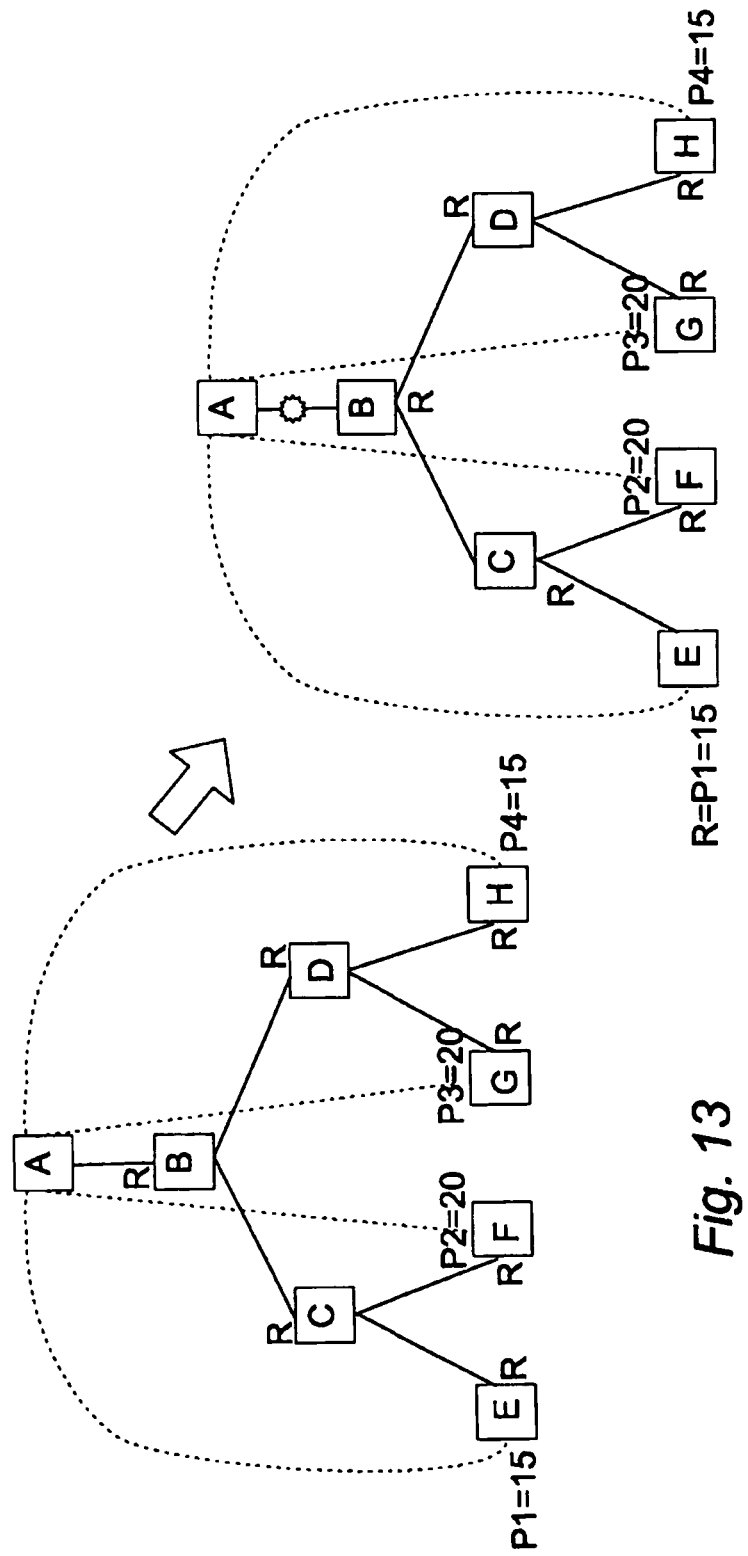
FIG. 13 is an alternative version of the third example of a network tree to illustrate a failure in a network link according to one embodiment of the present invention.

Referring to FIG. 12 the tree 1200 shows the links for the primary tree (continuous lines) and links for backup trees (dotted line). The failure in link AB results in use of the backup link AE and creation of a route A, E, C, B as this has the lowest RPC. However if the different values are not considered in the same level as is shown in FIG. 13 then the RPC through nodes E and H are the same and different considerations need to be made to select the preferred backup route. As can be seen from all these examples the present invention provides a method of configuring the best backup links for any particular failure based on hierarchy and RPC.

In the following an example of how MSTP parameters value are computed applying cross-level and inter-level relationship, previously described.

The following are a set of working assumptions which are applied to the MSTP configuration parameter calculations.

For a given topology the Selected Spanning Tree Set S_STS[i] is required. This represents the set of chosen Primary Spanning Trees (PST$_i$).

Each Primary Spanning Tree PST$_i$ is required to be given in terms of a list of links, each one indicated by means of the its linkID.

For each Primary Spanning Tree PST$_i$, the node which acts as the Root for that tree (r$_i$) is specified.

For each Primary Spanning Tree PST$_i$, a set of Backup Spanning Trees (BST$_{ij}$) is required to be given.

The Backup Spanning Tree BST$_{ij}$ is required to be given in terms of a list of Preferred Ports, one for each node in the network, except the root node. These ports shall be considered as the best alternate path toward the Root Bridge.

All the nodes in the network belong to the same MSTP Region.

An MSTP region is a definition which represents a domain where the MSTP instances and VLAN mapping apply. That is MSTP configuration parameters are meaningful just in the region. Two different regions have different MSTP instances and VLAN mapping and do not exchange this information.

For each MSTI the configuration allows determination of the following parameters: global value parameters, per bridge (or node) value parameters and per port value parameters as described below.

Global parameters:
MaxHops (for example range: 6-40 according to MSTP standard, IEEE 802.1Q)
Per-Bridge parameters
Bridge priority (b_prio[nodeID].)
Per-Port parameters
Port Path Cost (PPC)

Using the parameters mentioned above the process has to configure: the Root Bridge and PPC for each port of each. The Root port on each node represents the port chosen for the primary path. The port used for the backup path is referred to as "preferred" in the rest of the document. This name is used to distinguish the port from the port defined in the IEEE 802.1Q standard, where it is referred to as an alternate or a designated port. The "preferred" port is an important part of the present invention.

Each Bridge is identified by the BridgeID parameter. This is made up of the Bridge priority and the MAC address. In accordance with the present invention since whatever node in the network has the smaller BridgeID then the other nodes will be chosen as the Root Bridge, a fixed Bridge priority (e.g. 4096) is assigned for the Root note and a higher value for the other nodes (e.g. 32768). The sequence of root ports on the network represents the primary tree and the "preferred" Port represents the port to be used in case of link failure in the primary tree.

Each node chooses as the Root port the port that presents the minimum Root Path cost (RPC) towards the Root Bridge. The RPC is the sum of the port path cost (PPC) that is local to the specific node and the RPC received by the other nodes. The preferred port is port which presents the minimum RPC except the RPC of the Root port. Then in this way a PPC for the Root (PPCR); a PPC for the preferred port; and a default PPC (PPCD) for all the other ports are assigned for each node. In order to maintain the role of the ports irrespective of the type of failure which occurs and to be sure that the primary and backup trees used are those decided by the process in advance, the following relationship must be verified:

The Root Path Cost (RPC) received from the Preferred Port ($RPC_P$) shall be greater than the RPC received from the Root Port ($RPC_R$) and less than the RPC received from each other port in the node:

$$RPC_R < RPC_P < RPC(i) \quad \text{(Formula 3)}$$

The letters R and P are used throughout the document and diagrams to represent Root and Preferred respectively.

To meet the Formula 3, the following rules apply:

All root ports for all nodes in the tree have the same PPCR value (e.g. 1).

All default ports for all nodes in the tree have the same PPCD value (e.g. 65535 that is the maximum value allowed for configuration port of 16 bits).

Figure 14:
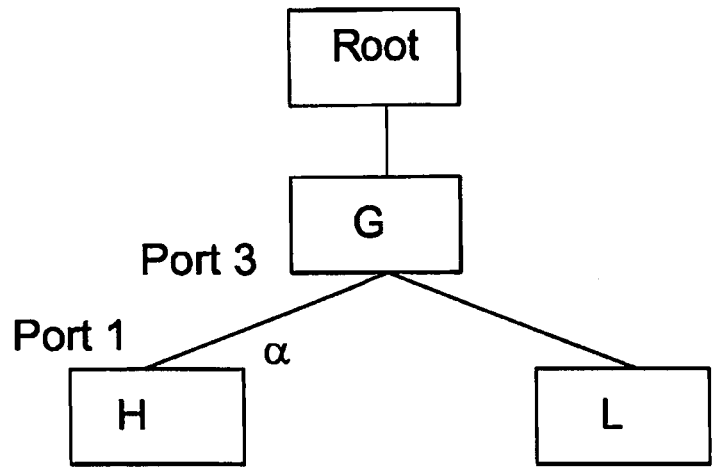
FIG. 14 is a block diagram showing details of ports used in the network according to one embodiment of the present invention.

Referring now to FIG. 14, port 1 of node H is the root port connecting node H with node G on link α. The present invention assigns the same value of PPCR to port 3 of node G (e.g. one).

The PPCPs for each node in the network are chosen to be different in accordance with the following.

Assuming that in the level i there are m PPCPNL, the following rules applies:

$$PPCPNL(1,i) < PPCPNL(2,i) < \ldots < PPCPNL(m, i) < PPCPL(i)$$

Figure 15:
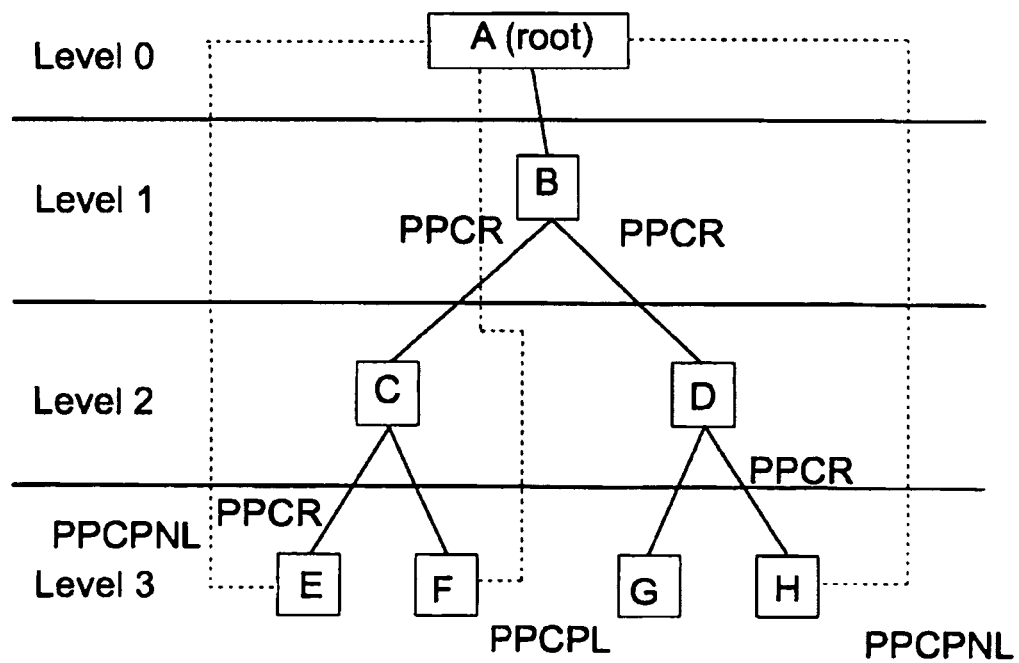
FIG. 15 is a tree topology showing different hierarchical levels for the network according to one embodiment of the present invention.

This is illustrated with respect to FIG. 15, where node A is the root node and belongs to level 0 in the hierarchy, node B belongs to level 1, nodes C and D belong to level 2, etc. For each level i, several (Port Path Costs Preferred Non-Local) PPCPNLs and one (Port Path Cost Preferred Local) PPCPL are defined. For example, let us assume that the link AH is the backup for link AB. Clearly, it is not a local backup, because AH is not directly connected to B. The link AF is a backup for the link CF. Clearly it is a local backup, because FA is directly connected to F.

If E and H have the same PPCPNL value, the backup path for the failure on the link connecting nodes A and B does not depend on RPC. In fact, B receives the same RPC by means of nodes C and D (that is: PPCPNL+2*PPCR), so the final choice will depend on the BridgeID of nodes C and D.

In order to make the backup path dependent only on RPC, it is necessary to define different values for PPCP for nodes in the same hierarchical level. If "i" and "i+1" referred to two sequent hierarchical levels, the following rule applies:

$$PPCPL(i) < PPCPNL(1, i+1)$$

Figure 16:
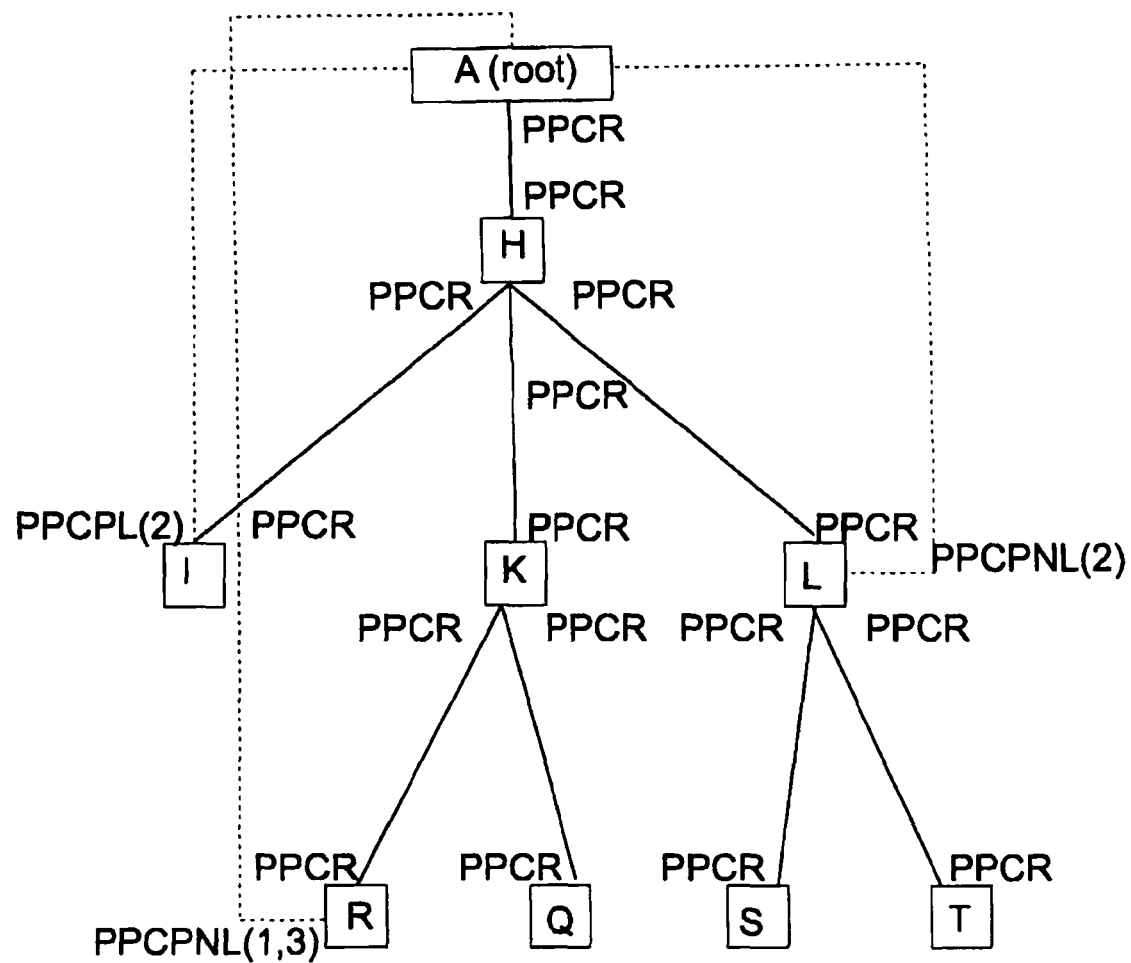
FIG. 16 is a tree topology showing different failure links and route path costs for a network according to one embodiment of the present invention.

Referring now to FIG. 16, the situation of a failure on the link connecting nodes A and H is considered. Node H receives the following RPCs from its neighbours $$RPC(I) = PPCPL(2) + PPCR$$

$$RPC(L) = PPCPLNL(1,2) + PPCR$$

$$RPC(R) = PPCPNL(1,3) + 2*PPCR$$

The manner in which the chosen backup link is determined depends on the value of the RPCs. In order to make H chose the link connecting L and A as the backup link, it is necessary that PPCPNL(1,3) is bigger than both PPCPNL(1,2) and PPCPL(2). It is important to determine the values of PPC according to the previous formulas such that any differences between the various PPCPNL and PPCPL values in the network are taken into account. This is achieved by assigning each hierarchical level (i) a unique range of values so as to meet the following relationship:

Range value of level $i$ < range value of level $(i+1)$

Thus the minimum gap between each PPCPNL values in the same level are also determined and depend on the Max Hop (MH) in the tree in accordance with the following:

$$PCPNL(j+1,i) > PPCPNL(j,i) + MH - 2$$

Similarly the minimum gap between PPCPNL(1,i) and PPCPL(i-1) is also determined and also depends on Max Hop in accordance with the following:

$$PPCPNL(1,i) = PPCPL(i-1) + MH - 1$$

In order to reduce computational time the process described, it is possible to pre-calculate the values of many of the configuration parameters that are required in the process.

The methodology described above effectively starts with an input for a specific network and generates an output which constitutes an optimised network topology that has been produced in accordance with the present invention. As previously indicated the inputs effectively comprise a traffic matrix composed of a list of VLANs; a network physical topology and the maximum number of spanning trees that a node can support. The traffic matrix comprises the different service types of VLANs, their bandwidth, a class of service (e.g. high, medium, low priority) and the various source and destination nodes for each VLAN. The network physical topology gives indications of the connectivity bandwidth for each link. The output produced by the method of the present invention provides a joint optimisation of spanning tree computation and VLAN grouping mapping along with an MSTP configuration parameter computation procedure. This provides traffic balancing, network resource optimisation, quality of service support for both primary and backup trees and is fully MSTP the standard compliant.

In simple terms this is brought about by the main inventive features of the invention which have been described in detail above. The main features preferably considered include:
- an iterative random spanning tree set generation;
- a set of VLANs sorting criteria, which takes into account class of service and/or VLAN bandwidth occupancy on each tree in the set;
- a best VLAN/tree mapping on each set, based on suitable cost functions and depending on available physical link bandwidth;
- a backup spanning tree computational process for each failure scenario;
- a selection of the best primary and backup solutions in terms of the number of served VLANs and network congestion levels;
- a criterion for assignment of costs for MSTP, based on the hierarchy level of each node in the primary spanning tree and the MSTP port role which introduces the concept of preferred port.

Several examples of routing in various situations will now be described highlighting how the best route can be derived using the present invention. At the same time non-optimal routing is presented with an indication of why the non-optimal route is non-optimal.

Figure 17A:
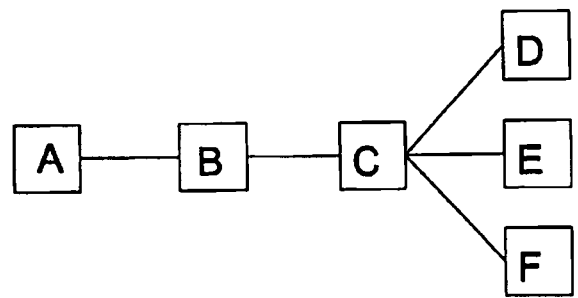
FIGS. 17 *a* and *b* are diagrams for showing optimal routing for a multicast VLAN according to one embodiment of the present invention.
Figure 17B:
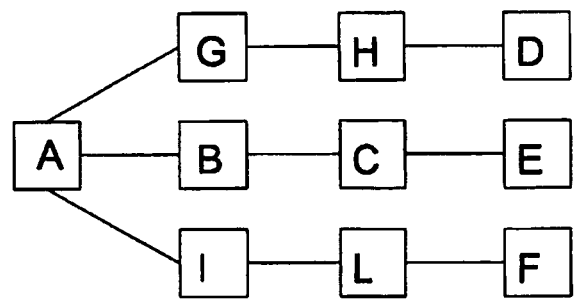

Referring initially to FIGS. 17*a* and 17*b* a routing for a multicast VLAN is shown. The best routing from the source node A to destinations D, E and F is calculated to be the routing shown in FIG. 17*a*. The routing shown in FIG. 17*b* shows a non-optimal routing which wastes bandwidth. The use of nodes G, H, I and L also use additional VLANs which may not be necessary in the overall network plan.

Figure 18:
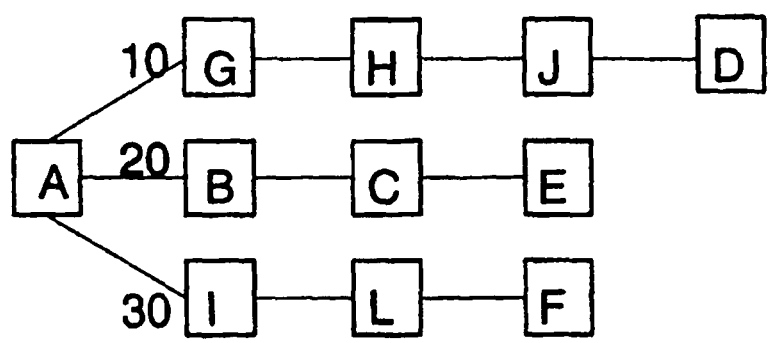
FIGS. 18 and 19 are diagrams for showing the best routing for a point to multipoint VLAN according to one embodiment of the present invention.
Figure 19:
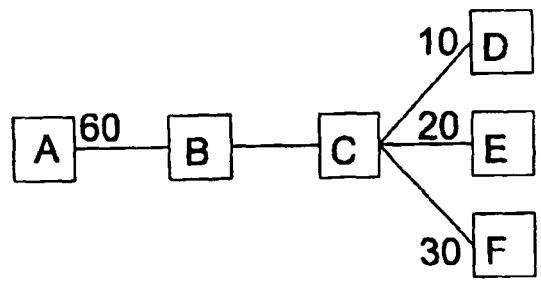

FIG. 18 shows the best routing for point-to-multipoint VLAN with different bandwidths from source node A to destinations D, E and F. The bandwidth for each routing is different, for example 10 for the route to Node D, 20 for the route to node E and 30 on the route to node F. FIG. 19 shows a non-optimal routing where the traffic is not balanced on the physical link by transmitting all the bandwidth through to links A to B and the B to C and then splitting the bandwidth from node C to nodes D, E and F at the level shown.

FIGS. 20, 21, 22 and 23 show a set of related flow diagrams of a preferred embodiment to demonstrate the algorithm for primary and backup tree calculation. The letters A, B1, B2, and C indicate the points at which the four diagrams inter-relate.

Figure 20:
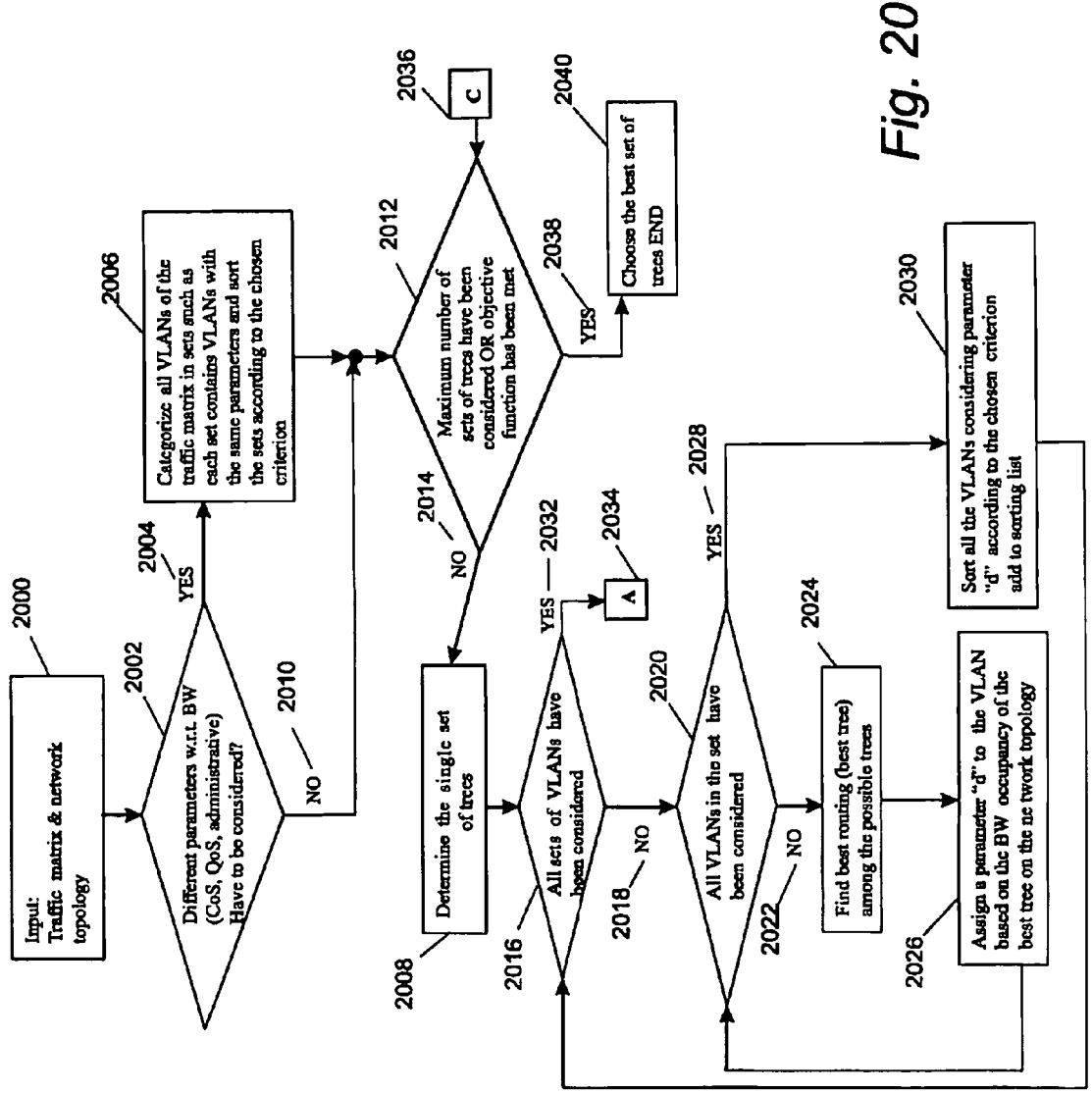
FIG. 20 is a flow diagram of an algorithm for primary and backup tree calculation according to one embodiment of the present invention.

Referring initially to FIG. 20 an input is generated which includes traffic matrix and network topology (step 2000). A determination is made as to whether different parameters with respect to bandwidth are to be considered (step 2002). These parameters include class of service, quality of service, administration etc. If different parameters are to be considered YES 2004, all VLANs in the traffic matrix are categorised into sets such that each set contains VLANs with the same parameters and/or type (step 2006). This leads to step 2012 where a determination is made as to whether all of the set of trees had been considered or the objective function has been met. If at step 2002 no different parameters are required (NO, 2010) the determination at step 2012 is made without step 2006. If the answer at step 2012 is NO (2014) a single set of trees to be considered is calculated (2008).

After this a determination is made as to whether all the sets of VLANs have been considered (step 2016). If NO (2018) then all VLANs in the set are considered by the algorithm (step 2020). If the answer to this is NO (2022), then the best trees are identified amongst the possible trees (step 2024). After determination of the best tree a parameter "d" (as previously defined) is assigned to the VLAN based on the bandwidth occupancy of the best tree on the network topology (step 2026). The process then reverts to step 2020. If at step 2020 all VLANs in the set have been considered, YES (2028) all the VLANs are sorted in accordance with parameter "d" according to a chosen criterion and then are added to the sorting list (step 2030). The process then reverts again to step 2016. These loops continue until all sets of VLANs have been considered YES (2032), at which point the process continues to point A (2034), which is the primary tree calculation (including tree selection, VLAN grouping and mapping on the trees) shown in FIG. 21.

Figure 21:
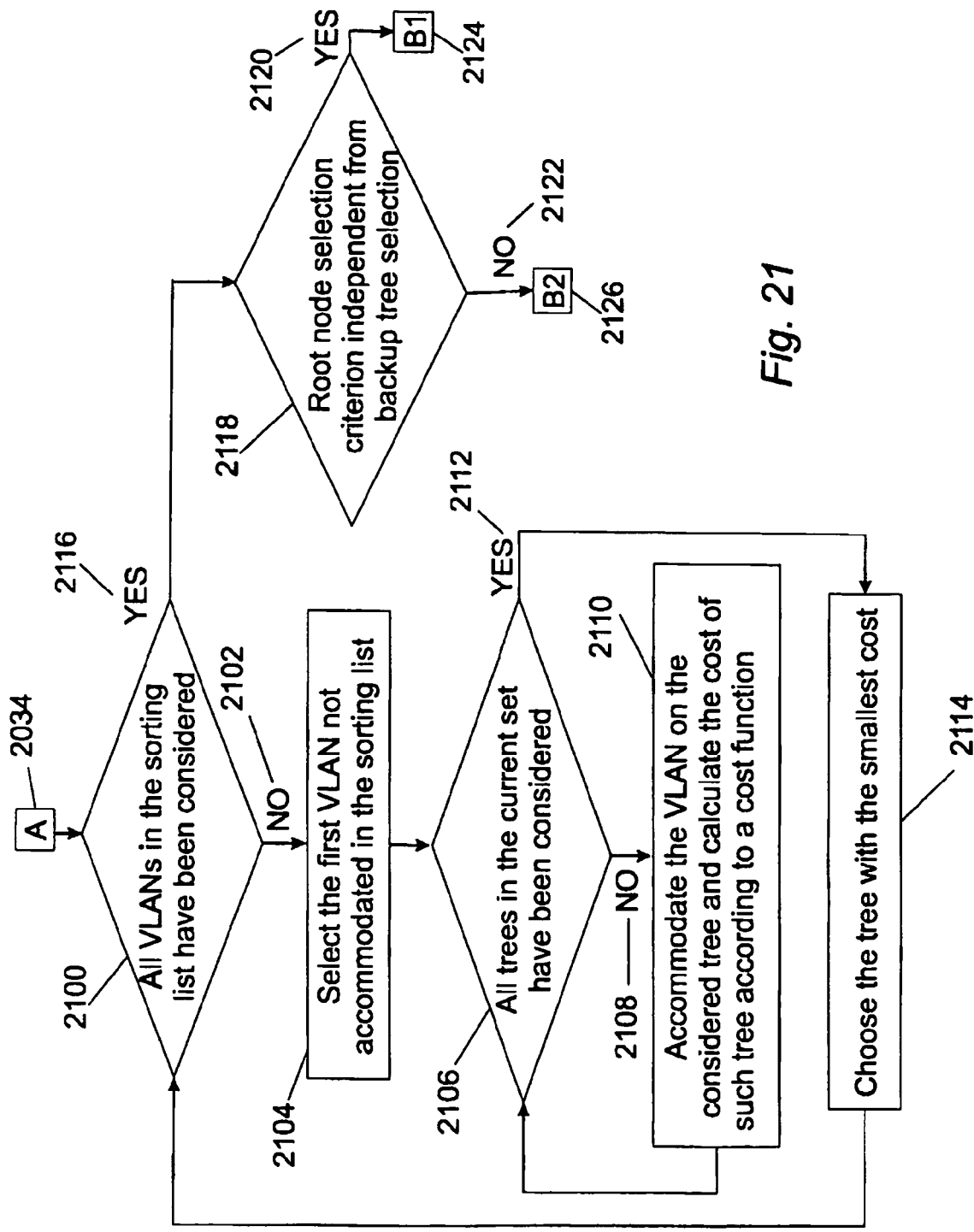
FIG. 21 is a flow diagram for a primary tree calculation according to one embodiment of the present invention.

Referring now to FIG. 21, the process continues from point A (2034 in FIG. 20). A determination is made as to whether all VLANs in the sorting list have been considered (step 2100). If the answer is NO (2102), a selection is made of the first VLAN not accommodated in the sorting list (step 2104). The VLAN that has not been accommodated that is selected in step 2104 is considered during the next steps. A determination as to whether all trees in the current set had been considered is made at step 2106. If NO, step 2108, then the VLAN identified at step 2104 is accommodated on the considered tree and the cost of the resultant tree is calculated in accordance with a cost function (step 2110). The cost function may depend on the objective function. The used formula is a possible cost function to obtain suitable traffic balance. A different formula may be used with the same objective. The process then reverts to step 2106 and loop continues until all trees in the current set have been considered. This results in an answer YES (2112). From all the available trees, the tree with the smallest cost is chosen to be the primary tree for the current VLAN (step 2114). The process then reverts to step 2100 and loop continues until all VLANs in the sorting list have been considered. This results in an answer YES (2116) and a determination is made as to whether the root selection criterion is independent of the backup tree calculations. If YES (2120) the process continues to point B1(2124), from which to the backup trees for each primary tree is calculated as shown in FIG. 22, if NO (2122) the process continues to point B2 (2126), from which to the backup trees for each primary tree is calculated as shown in FIG. 23.

Figure 22:
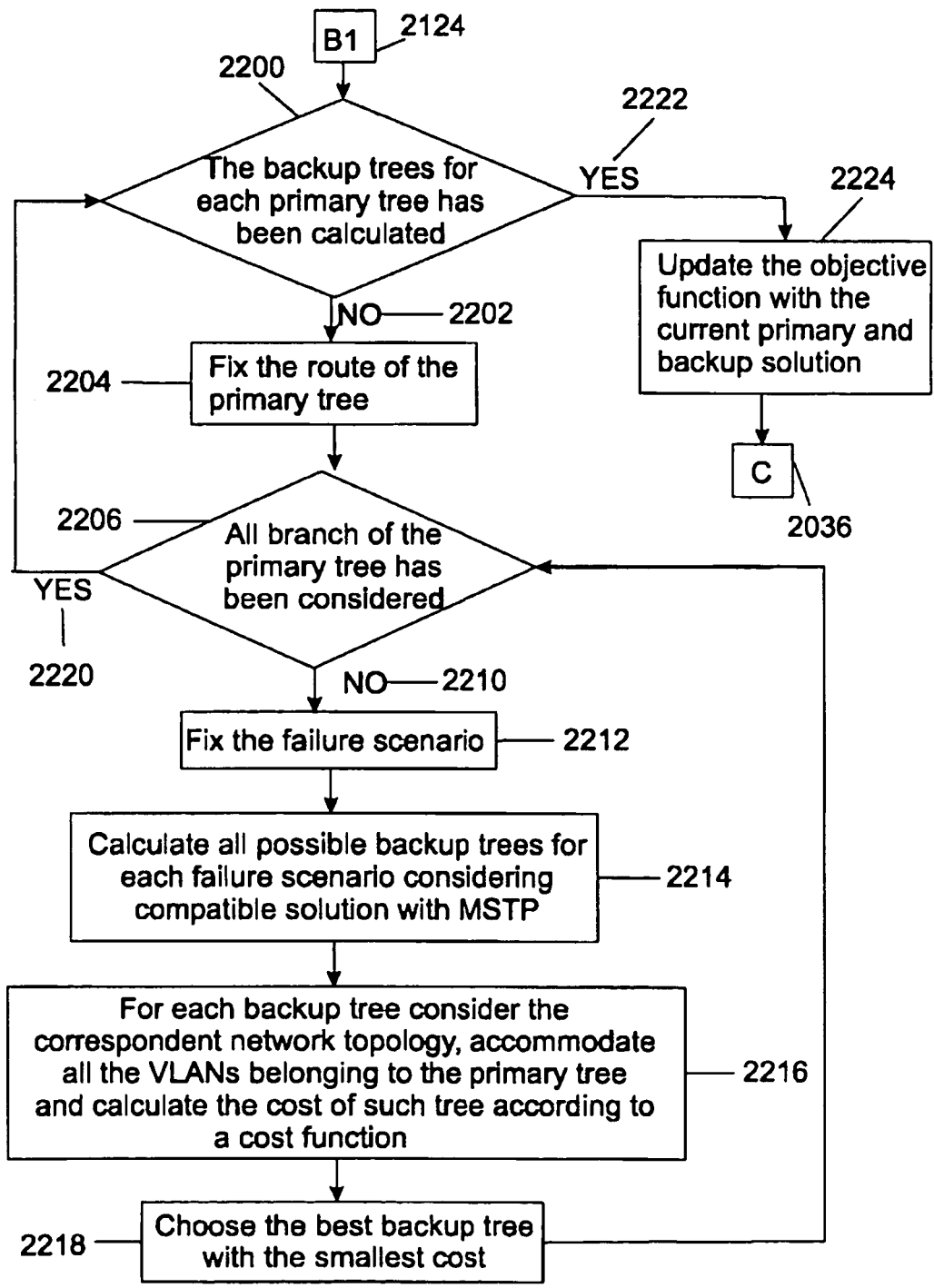
FIG. 22 is a flow diagram of a backup tree calculation according to one embodiment of the present invention.

Referring now to FIG. 22, the process continues from point B1(2124 in FIG. 21). A determination is made as to whether a backup tree for each primary tree have been calculated (step 2200). If NO (2202) the root of the primary tree is fixed (step 2204), e.g. according to different criteria as described. Next a determination is made as to whether all the branches of the primary tree have been considered for the determination of backup trees (step 2206). If NO (2210) a solution to the failure scenario is determined (step 2212). All possible backup trees for each failure scenario that are compatible with MSTP are calculated (step 2214). Then for each possible backup tree a number of considerations are carried out. These include determination as to whether the backup tree corresponds with the network topology, determination as to whether all VLANs belonging to the primary tree are accommodated and calculation of the cost of each backup tree according to cost function (step 2216). This cost function may be identical or different from the cost function used in step 2110. The backup tree that satisfies the network requirements, that accommodates the VLANs in the most optimal manner and with the smallest cost is then selected (step 2218). The loops then returns to step 2206 and continues until all branches of the primary tree had been considered for backup routes. When this is the case (YES, (2220) the process returns to step 2200 to determine whether all the backup trees for each primary tree have been calculated. When this process is completed (YES, 2222) the process update the objective function with the current primary and backup solution (2224) and returns to point C (2036 in FIG. 20).

Figure 23:
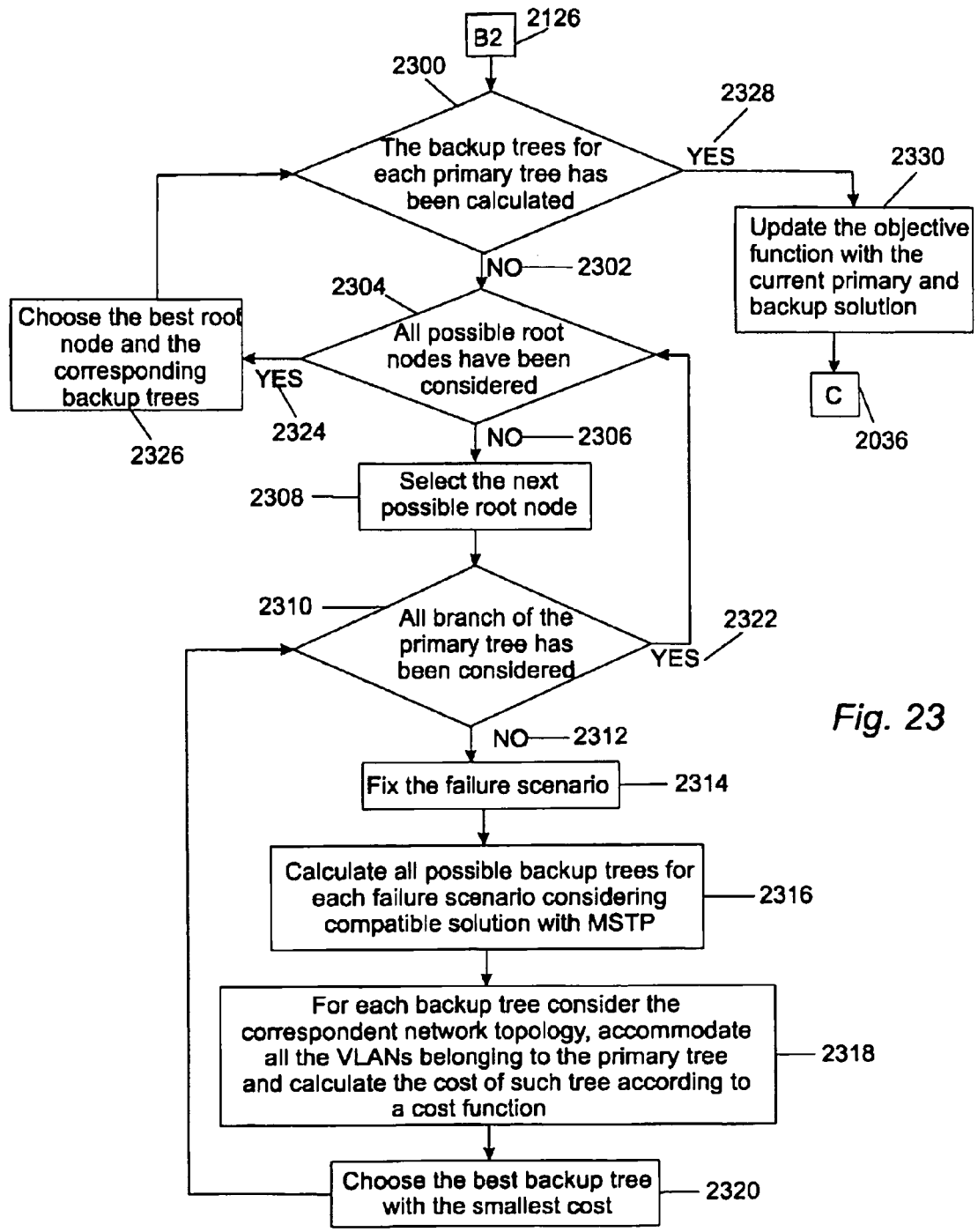
FIG. 23 is a flow diagram of a backup tree calculation according to one embodiment of the present invention.

Referring now to FIG. 23, the process continues from point B2 (2126 in FIG. 21). A determination is made as to whether a backup tree for each primary tree has been calculated (step 2300). If NO (2302) a determination is made as to whether all nodes in the tree have been considered as possible roots (2304). If NO (2206) the process selects the next node not yet considered as the root node (2308). Next a determination is made as to whether all the branches of the primary tree have been considered for the determination of backup trees (step 2310). If NO (2312) a solution to the failure scenario is determined (step 2314). All possible backup trees for each failure scenario that are compatible with MSTP are calculated (step 2316). Then for each possible backup tree a number of considerations are carried out. These include determination as to whether the backup tree corresponds with the network topology, determination as to whether all VLANs belonging to the primary tree are accommodated and calculation of the cost of each backup tree according to cost function (step 2318). This cost function may be identical or different from the cost function used in step 2110. The backup tree that satisfies the network requirements, that accommodates the VLANs in the most optimal manner and with the smallest cost is then selected (step 2320). The loop then returns to step 2310 and continues until all branches of the primary tree had been considered for backup routes. When this is the case (YES, 2322) the process returns to step 2304 and the loop continues until all nodes in the tree have been considered as possible root node. When this process is completed (YES, 2324) the process chooses the best root node and the corresponding set of backup trees (2326). The process returns to step 2300 to determine whether all the backup trees for each primary tree have been calculated. When this process is completed (YES, 2328) the process updates the objective function with the current primary and backup solution (2330) and returns to point C (2036 in FIG. 20).

Returning back to FIG. 20, the input from point C in FIG. 22 or FIG. 23 is fed into step 2012 where it is determined whether the maximum number of sets of trees have been considered or the objective function has been met. If yes (step 2038) the process chooses the best set of primary and backup trees (step 2040). The process then ends.

Figure 24:
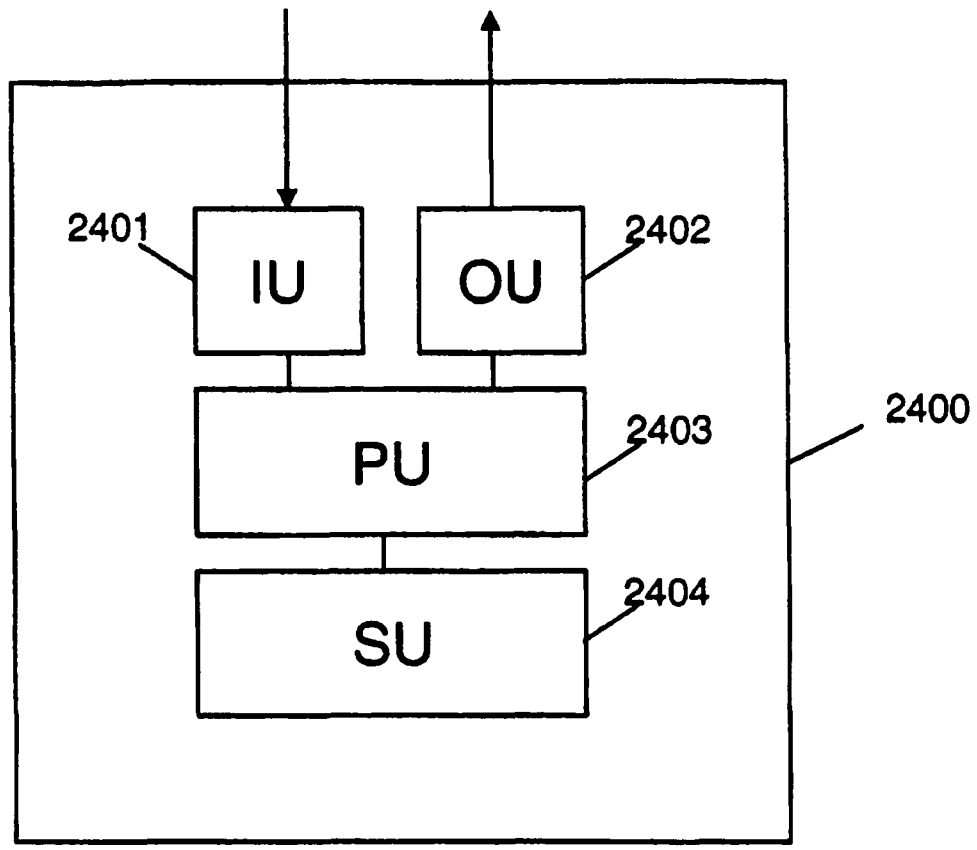
FIG. 24 is a schematic illustration of an embodiment of a network planning apparatus.

Referring now to FIG. 24 which is a schematic illustration of an embodiment of a network planning apparatus 2400. The apparatus 2400 comprises a input unit 2401, an output unit 2402, a processing unit 2403, and preferably also a storage unit 2404.

The apparatus 2400 is adapted to determine a set of spanning trees within the network for providing one or more of the number of routes for consideration, wherein each spanning tree comprises a plurality of links. The determined set of spanning trees may be fed into the apparatus via input unit 2401, fetched from the storage unit 2404, and/or calculated by the processing unit 2403.

The processing unit 2403 is adapted to sort the VLANs into an order based on one or more VLAN criteria for the network topology. VLAN criteria are preferably input via input unit 2401 but may be adapted by the processing unit 2403 for the sorting. Alternatively or in addition, the VLAN criteria—least in part—may be fetched from the storage unit 2404.

The processing unit 2403 is further adapted to map the sorted VLANs onto the set of spanning trees in an order to optimise one or more characteristics relating to the network or any associated feature thereof for the or each combination of spanning tree and VLAN to thereby determine an optimised VLAN tree mapping for each set of spanning trees for each route, to select a best primary tree from the set of spanning trees for each route in the network topology according to the optimised VLAN tree mapping, to analyse possible failures for each link in the best primary tree for each route to derive for each possible failure a backup tree which is optimised in terms of the characteristics and criteria to determine one or more best backup trees to replace the or each best primary tree in the event of a possible failure of the analysed possible failures, and to output information relating to the best primary tree and the determined one or more best backup trees for each best primary tree for each route in the network.

This output information may be then transferred to an entity (not shown) adapted to perform a translation of the best primary tree and the determined one or more best backup trees for each best primary tree for each route in the network into a set of spanning tree protocol configuration parameters which in combination form a network plan. A preferred alternative implementation of the network management tool is that the processing unit 2403 itself performs the translation and outputs via output unit 2402 the set of spanning tree protocol configuration parameters for the primary and backup trees as the output information relating to the best primary tree and the determined one or more best backup trees for each best primary tree for each route in the network.

Network characteristics may comprise at least one of details of the network topology, the maximum number of VLANs to be accommodated in the network, the type of VLANs accommodated in the network, a maximum number of required spanning trees within the network etc.

The processing unit 2403 is preferably adapted to carry out an iteration of each of the processes in order to optimise the network characteristics or features for the or each process to determine if a better best VLAN tree mapping is available. The optimisation of the network characteristics or features are preferably achieved by optimising one or more of: a maximum number of VLANs, a maximum bandwidth, a congestion level on the or each link of the network, a traffic balance on the network, a traffic accommodation with respect to one or more network administrative parameters and a balance of type of traffic on the or each links. Examples for the network administrative parameters are one or more of CoS, QoS, port path costs, root path costs, and preferred port requirement.

The processing unit 2403 is preferably adapted to determine the set of spanning trees according to at least one criterion from a group of criteria comprising a random basis, according to a minimum number of trees specified by an operator, and a selection of a minimized number of disjoint trees. A random basis provides an excellent balance between computational effort and network planning optimization as described before. A minimum number of trees specified by the operator may further help to reduce computational effort. Furthermore a selection according to a minimization of disjointing trees, i.e. to select trees having a minimum number of arches shared with other trees, favours the traffic distribution in the network.

Furthermore, the processing unit 2403 may be adapted to sort the VLANs in accordance with at least one sorting criterion from a criteria group comprising a VLAN type, a VLAN class of service, an expected level of congestion on the or each link, a lowest total cost on the or each link, and a lowest total bandwidth on the or each link.

The processing unit 2403 may be further adapted to determine a root node for each backup tree such that the backup tree to meet the optimization criterion, e.g. maximum number of accommodated VLANs.

The processing unit 2403 may be preferably adapted to generate a spanning tree protocol configuration parameter set generated by determining for each node in a primary tree a root port to represent the port chosen for the primary link and for each node in a backup tree a preferred port to represent the port chosen for the backup link. The sequence of root ports may be derived to define the primary tree for the network plan and/or to define the backup trees for the network plan. A root port is that port that presents the minimum root path cost (RPC) to a root node. A preferred port is that port that presents the minimum root path cost (RPC) to a root node other than that for the root port.

The processing unit 2403 may be preferably adapted to initiate an automatically outputting of the set of spanning tree protocol configuration parameters to implement the network plan.

The processing unit 2403 may be adapted to store—at least temporarily—at least some of results of the described steps in the storage unit 2404 and to retrieve information necessary for processing from the storage unit 2404.

Following the process steps identified above and using the methodology described in detail with reference to the figures the present invention provides a solution which allows an operator to configure an Ethernet network having the following advantages:
an optimal balance to the traffic in the network;
a reduction in over provisioning which thereby produces an optimal use of network resources;
a methodology which supports quality of service;
the provision of protection trees while maintaining quality of service considerations;
ability to use the maximum number of VLANs and allowed by the standard (ie of the order of 4000);
allowing the extension of Ethernet technology to larger networks that are generally characterised by a generic topology, for example mesh networks;
allowing a reduction in cost of the network that can apply layer 2 technology instead of layer 3 or 2.5 technology, for example such as IP or MPLS;
automation of the processes and procedures mentioned above, particularly the large size networks and large size traffic matrices;
allowing choice the root of each tree according to network operator needs, without the need to depend on MAC address;
use of any node (i.e. any MAC address) and the substitution of a node in case of failure without the need to reconfigure the network.

It will be appreciated that there may be many variations and modifications to the method and apparatus described above. It will be appreciated that the methodology and apparatus is not limited to Ethernet network, but can be used for other networks as well.

The invention claimed is:

1. A method, utilizing a computing device operating a network planning for an Ethernet based network having a network topology and a plurality of VLANs to be associated therein wherein the network requires a number of routes therethrough, the method comprising the steps of:
determining a set of spanning trees within the network for providing one or more of the number of routes for consideration, each spanning tree comprising a plurality of links;
sorting the VLANs into an order based on one or more VLAN criteria for the network topology;
mapping each of the sorted VLANs onto the set of spanning trees in order to optimize one or more characteristics relating to the network or any associated feature thereof for the or each combination of spanning tree and VLAN to thereby determine an optimized VLAN tree mapping for each set of spanning trees for each route;
selecting a best primary tree for each of the sorted VLANs, based on the order in which the VLANS were sorted, from the set of spanning trees on which the each of the sorted VLANs is mapped for each route in the network topology;
analysing possible failures for each link in the best primary tree for each route to derive for each possible failure a backup tree which is optimized in terms of the characteristics and criteria to determine one or more best backup trees to replace the or each best primary tree in the event of a possible failure of the analysed possible failures;
translating the best primary tree and the determined one or more best backup trees for each best primary tree for each route in the network into a set of Multiple Spanning Tree Protocol configuration parameters which in combination form a network plan, and
outputting information relating to the best primary tree and the determined one or more best backup trees for each best primary tree for each route in the network.

2. The method of claim 1, further comprising iterating the determining, sorting and mapping steps to optimize the characteristics and criteria for the or each step to determine if a better best VLAN tree mapping is available.

3. The method of claim 1, wherein the step of determining a set of spanning trees comprises determining a set of spanning trees according to at least one criterion from a group of criteria comprising
a random basis,
according to a minimum number of trees specified by an operator, and
a selection of a minimized number of disjoint trees.

4. The method of claim 1, wherein the step of sorting the VLANs into an order comprises:
determining a VLAN type of each VLAN and using the VLAN type to order the VLANs.

5. The method of claim 1, wherein the step of sorting the VLANs into an order comprises:
determining a VLAN class of service of each VLAN and using the VLAN class of service to order the VLANs.

6. The method of claim 1, wherein the step of sorting the VLANs into an order comprises:

determining a VLAN expected level of congestion of each VLAN and using the VLAN level of congestion to order the VLANs.

7. The method of claim 1, wherein the step of mapping the VLANs onto the set of spanning trees comprises:
determining a cost of each link in the or each spanning tree in order to determine the spanning trees with the lowest total cost.

8. The method of claim 1, wherein the step of mapping the VLANs onto the set of spanning trees comprises:
determining a bandwidth of each link in the or each spanning tree in order to determine the spanning trees with a lowest total bandwidth.

9. The method of claim 1, wherein the step of determining one or more backup trees, comprises:
determining a root node for each backup tree such that the backup tree has a minimum possible number of VLANs to achieve a backup link.

10. The method of claim 1, wherein the step of determining one or more backup trees, comprises:
attempting to find a local backup link for the possible failure,
if no local backup link is available, attempting to find a non-local backup link for the possible failure.

11. The method according to claim 1, further comprising the step of
outputting the set of spanning tree protocol configuration parameters as the information relating to the best primary tree and the determined one or more best backup trees for each best primary tree for each route in the network.

12. The method of claim 11, wherein the step of translating the output to a spanning tree protocol configuration parameter set, comprises:
for each node in a primary tree determining a root port to represent the port chosen for the primary link;
and for each node in a backup tree determining a preferred port to represent the port chosen for the backup link.

13. The method of claim 12, further comprising deriving a sequence of root ports in order to define the primary tree for the network plan.

14. The method of claim 12, further comprising deriving a sequence of preferred ports in order to define the backup tree for the network plan.

15. The method of claim 12, further comprising calculating the root port to be that port that presents a minimum root path cost (RPC) to a root node.

16. The method of claim 12, further comprising calculating the preferred port to be that port that presents a minimum root path cost (RPC) to a root node other than that for the root port.

17. A network planning apparatus for an Ethernet based network having a network topology and a plurality of VLANs to be associated therein wherein the network requires a number of routes therethrough, the apparatus comprising:
means for determining a set of spanning trees within the network for providing one or more of the number of routes for consideration, wherein each spanning tree comprising a plurality of links;
means for sorting the VLANs into an order based on one or more VLAN criteria for the network topology;
means for mapping each of the sorted VLANs onto the set of spanning trees in an order to optimize one or more characteristics relating to the network or any associated feature thereof for the or each combination of spanning tree and VLAN to thereby determine an optimized VLAN tree mapping for each set of spanning trees for each route;
means for selecting a best primary tree for each of the sorted VLANs, based on the order in which the VLANs were sorted, from the set of spanning trees on which the each of the sorted VLANs is mapped for each route in the network topology;
means for analysing possible failures for each link in the best primary tree for each route to derive for each possible failure a backup tree which is optimized in terms of the characteristics and criteria to determine one or more best backup trees to replace the or each best primary tree in the event of a possible failure of the analysed possible failures;
means for translating the best primary tree and the determined one or more best backup trees for each best primary tree for each route in the network into a set of Multiple Spanning Tree Protocol configuration parameters which in combination form a network plan; and
means for outputting information relating to the best primary tree and the determined one or more best backup trees for each best primary tree for each route in the network.

18. The apparatus of claim 17, further comprising iterating the determining, sorting and mapping steps to optimize the characteristics and criteria for the or each step to determine if a better best VLAN tree mapping is available.

19. The apparatus of claim 17 wherein the means for determining a set of spanning trees comprises means for determining a set of spanning trees according to at least one criterion from a group of criteria comprising
a random basis,
according to a minimum number of trees specified by an operator, and
a selection of a minimized number of disjoint trees.

20. The apparatus of claim 17 wherein means for sorting the VLANs into an order comprises:
means for determining a VLAN type of each VLAN and using the VLAN type to order the VLANs.

21. The apparatus of claim 17, wherein the means for sorting the VLANs into an order comprises:
means for determining a VLAN class of service of each VLAN and using the VLAN class of service to order the VLANs.

22. The apparatus of claim 17 wherein the means for sorting the VLANs into an order comprises:
means for determining a VLAN expected level of congestion of each VLAN and using the VLAN expected level of congestion to order the VLANs.

23. The apparatus of claim 17, wherein the means for mapping the VLANs onto the set of spanning trees comprises:
means for determining a cost of each link in the or each spanning tree in order to determine the spanning trees with a lowest total cost.

24. The apparatus of claim 17, wherein the means for mapping the VLANs onto the set of spanning trees comprises:
means determining a bandwidth of each link in the or each spanning tree in order to determine the spanning trees with a lowest total bandwidth.

25. The apparatus of claim 17, wherein means for determining one or more backup trees, comprises:
means for determining a root node for each backup tree such that the backup tree has a minimum possible number of VLANs to achieve a backup link.

26. The apparatus of claim 17, wherein the means for determining one or more backup trees, comprises:
means for attempting to find a local backup link for the possible failure, and
if no local backup link is available, means for attempting to find a non-local backup link for the possible failure.

27. The apparatus of claim 17, further comprising:
means for outputting the set of spanning tree protocol configuration parameters as the information relating to the best primary tree and the determined one or more best backup trees for each best primary tree for each route in the network.

28. The apparatus of claim 27, wherein the means for translating the output to a spanning tree protocol configuration parameter set, comprises:
for each node in a primary tree means, for determining a root port to represent the port chosen for the primary link;
and for each node in a backup tree, means for determining a preferred port to represent the port chosen for the backup link.

29. The apparatus of claim 27, further comprising means for deriving a sequence of root ports in order to define the primary tree for the network plan.

30. The apparatus of claim 27, further comprising means for deriving a sequence of preferred ports in order to define the backup tree for the network plan.

31. The apparatus of claim 27, further comprising means for calculating the root port to be that port that presents a minimum root path cost (RPC) to a root node.

32. The apparatus of claim 27, further comprising means for calculating the preferred port to be that port that presents a minimum root path cost (RPC) to a root node other than that for the root port.

* * * * *